United States Patent
Fehrenbach et al.

(10) Patent No.: US 11,848,877 B2
(45) Date of Patent: *Dec. 19, 2023

(54) SOUNDING FEEDBACK UTILIZING SHORTENED FRAME STRUCTURES

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Thomas Haustein, Potsdam (DE); Thomas Wirth, Kleinmachnow (DE); Lars Thiele, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,558

(22) Filed: Aug. 2, 2022

(65) Prior Publication Data

US 2022/0393812 A1   Dec. 8, 2022

Related U.S. Application Data

(63) Continuation of application No. 16/271,438, filed on Feb. 8, 2019, now Pat. No. 11,463,224, which is a
(Continued)

(30) Foreign Application Priority Data

Aug. 11, 2016   (EP) .................................. 16183898

(51) Int. Cl.
*H04W 72/23*    (2023.01)
*H04B 7/0417*   (2017.01)
(Continued)

(52) U.S. Cl.
CPC ......... *H04L 5/0007* (2013.01); *H04B 7/0417* (2013.01); *H04B 7/0626* (2013.01);
(Continued)

(58) Field of Classification Search
CPC ... H04B 7/0417; H04B 7/0626; H04L 5/0007; H04L 5/0035; H04L 5/0048;
(Continued)

(56) References Cited

U.S. PATENT DOCUMENTS 8,483,149 B2   7/2013   Tiirola et al.
9,504,027 B2   11/2016  Seo et al.
(Continued)

FOREIGN PATENT DOCUMENTS

CN   101946545 A   1/2011
CN   102656837 A   9/2012
(Continued)

OTHER PUBLICATIONS

"NPL_3GPP TS 36.211 version 13.1.0 Release 13_2016", ETSI TS 136 211 3 V13.1.0 (Apr. 2016), Apr. 2016, pp. 1-157.
(Continued)

*Primary Examiner* — Thomas R Cairns
*Assistant Examiner* — Kai Chang
(74) *Attorney, Agent, or Firm* — Perkins Coie LLP; Michael A. Glenn

(57) ABSTRACT

Embodiments provide a transceiver, wherein the transceiver is configured to transmit or receive data in at least one transmission time interval on certain allocated resource elements of a wireless communication system, wherein the transceiver is configured to at least partially blank a transmission time interval for a data block to be transmitted or received by the transmitter, wherein the transceiver is configured (a) to signal to another transceiver a transmission grant in a blanked part of the at least partially blanked
(Continued)

transmission time interval or (b) to at least partially blank the transmission time interval based on a blanking pattern received from another transceiver.

27 Claims, 16 Drawing Sheets

Related U.S. Application Data continuation of application No. PCT/EP2017/069815, filed on Aug. 4, 2017.

(51) Int. Cl.
| | |
|---|---|
| *H04B 7/06* | (2006.01) |
| *H04L 25/02* | (2006.01) |
| *H04L 27/26* | (2006.01) |
| *H04W 72/0446* | (2023.01) |
| *H04L 5/14* | (2006.01) |
| *H04L 5/00* | (2006.01) |

(52) U.S. Cl.
CPC .......... *H04L 5/0035* (2013.01); *H04L 5/0051* (2013.01); *H04L 5/0062* (2013.01); *H04L 5/0082* (2013.01); *H04L 5/0094* (2013.01); *H04L 25/0226* (2013.01); *H04L 27/2628* (2013.01); *H04W 72/0446* (2013.01); *H04W 72/23* (2023.01); *H04L 5/0048* (2013.01); *H04L 5/0073* (2013.01); *H04L 5/0085* (2013.01); *H04L 5/14* (2013.01)

(58) Field of Classification Search
CPC ... H04L 5/0051; H04L 5/0053; H04L 5/0062; H04L 5/0073; H04L 5/0078; H04L 5/0082; H04L 5/0085; H04L 5/0094; H04L 5/14; H04L 25/0226; H04L 27/2628; H04W 72/0446; H04W 72/23
See application file for complete search history.

(56) References Cited

U.S. PATENT DOCUMENTS

| | | |
|---|---|---|
| 10,045,233 B2 | 8/2018 | Shoshan et al. |
| 10,567,074 B2 | 2/2020 | Roessel et al. |
| 2010/0069089 A1 | 3/2010 | Wang |
| 2011/0151790 A1 | 6/2011 | Khandekar et al. |
| 2013/0083729 A1 | 4/2013 | Xu et al. |
| 2013/0229961 A1 | 9/2013 | Ma et al. |
| 2013/0259022 A1 | 10/2013 | Jitsukawa et al. |
| 2014/0092792 A1 | 4/2014 | Kim et al. |
| 2014/0112127 A1* | 4/2014 | Jayaram ................ H04W 24/08 370/252 |
| 2015/0098369 A1 | 4/2015 | Song et al. |
| 2015/0163782 A1 | 6/2015 | Ji et al. |
| 2015/0307945 A1 | 10/2015 | Nakanishi et al. |
| 2016/0057759 A1 | 2/2016 | Seo et al. |
| 2016/0197712 A1 | 7/2016 | Sorrentino et al. |
| 2016/0204921 A1 | 7/2016 | Kim et al. |
| 2016/0233899 A1 | 8/2016 | Thomas et al. |
| 2016/0269104 A1* | 9/2016 | Lee .......................... H04J 11/00 |
| 2016/0330011 A1* | 11/2016 | Lee ...................... H04W 52/10 |
| 2017/0013565 A1* | 1/2017 | Pelletier ............. H04W 52/367 |
| 2017/0202025 A1 | 7/2017 | Ouchi et al. |
| 2017/0250787 A1 | 8/2017 | Geirhofer et al. |
| 2018/0007667 A1 | 1/2018 | You et al. |
| 2018/0063820 A1 | 3/2018 | Xiong et al. |

FOREIGN PATENT DOCUMENTS

| | | |
|---|---|---|
| CN | 103503349 A | 1/2014 |
| CN | 104272613 A | 1/2015 |
| CN | 104488213 A | 4/2015 |
| CN | 105122675 A | 12/2015 |
| CN | 105765931 A | 7/2016 |
| EP | 1150462 | 10/2001 |
| EP | 2999141 A1 | 3/2016 |
| KR | 20130084176 A | 7/2013 |
| KR | 20150060875 A | 6/2015 |
| KR | 20150115945 A | 10/2015 |
| KR | 20160051741 A | 5/2016 |
| KR | 20160085753 A | 7/2016 |
| KR | 20160093108 A | 8/2016 |
| WO | 2010137666 A1 | 12/2010 |
| WO | 2013109049 A1 | 7/2013 |
| WO | 2014008073 A1 | 1/2014 |
| WO | 2015069065 A1 | 5/2015 |
| WO | 2015094914 A1 | 6/2015 |
| WO | 2016064049 A1 | 4/2016 |

OTHER PUBLICATIONS

"NPL_3GPP TS 36.213 version 13.1.1 Release 13_2016", ETSI TS 136 213 V13.1.1 (May 2016), May 2016, pp. 1-363.
"NPL_3GPP_TS_36.423_V8.0.0_(Dec. 2007)", 3GPP TS 36.423 V8.0.0 (Dec. 2007), Dec. 2007.
"NPL_howltestuffworks.blogspot.de—Sounding Reference Signal Procedure_2014", http://howltestuffworks.blogspot.com/2014/07/sounding-reference-sign.
"NPL_niviuk.free LTE UE SRS", http://niviuk.free.fr/lte_srs.php.

* cited by examiner

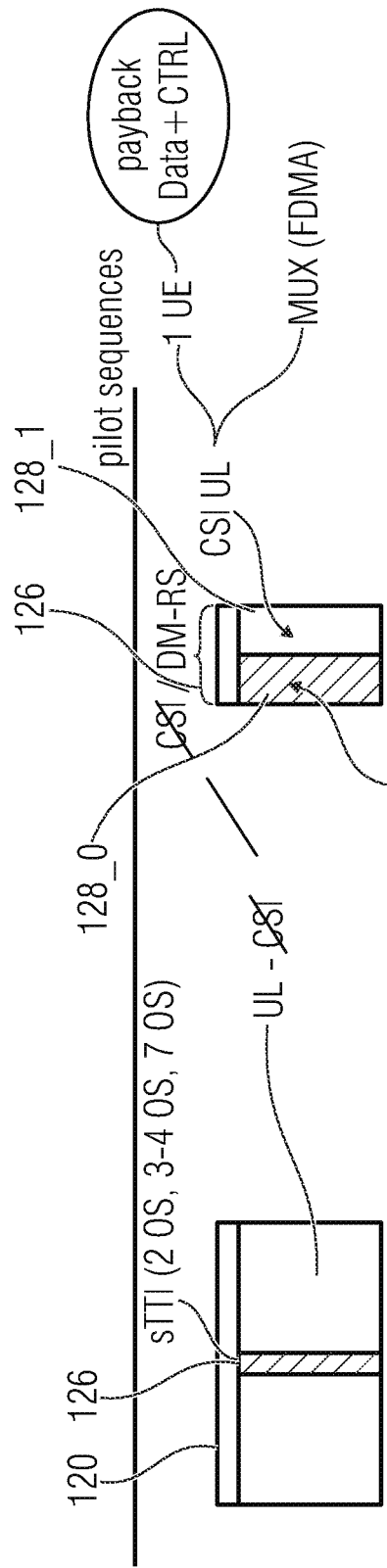
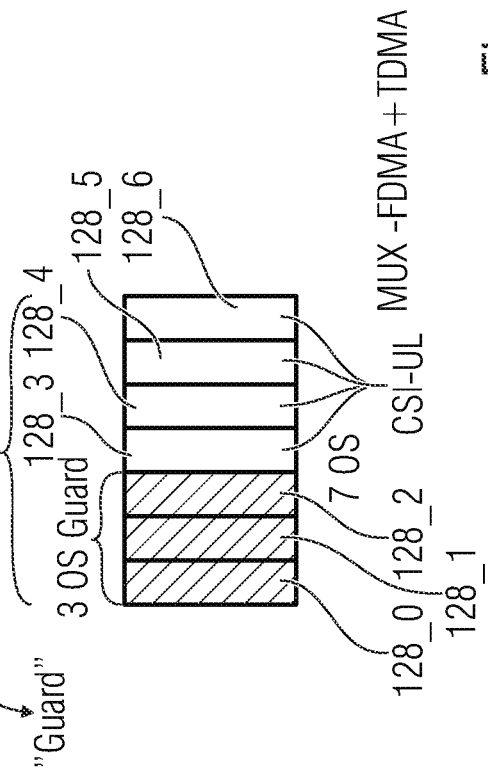

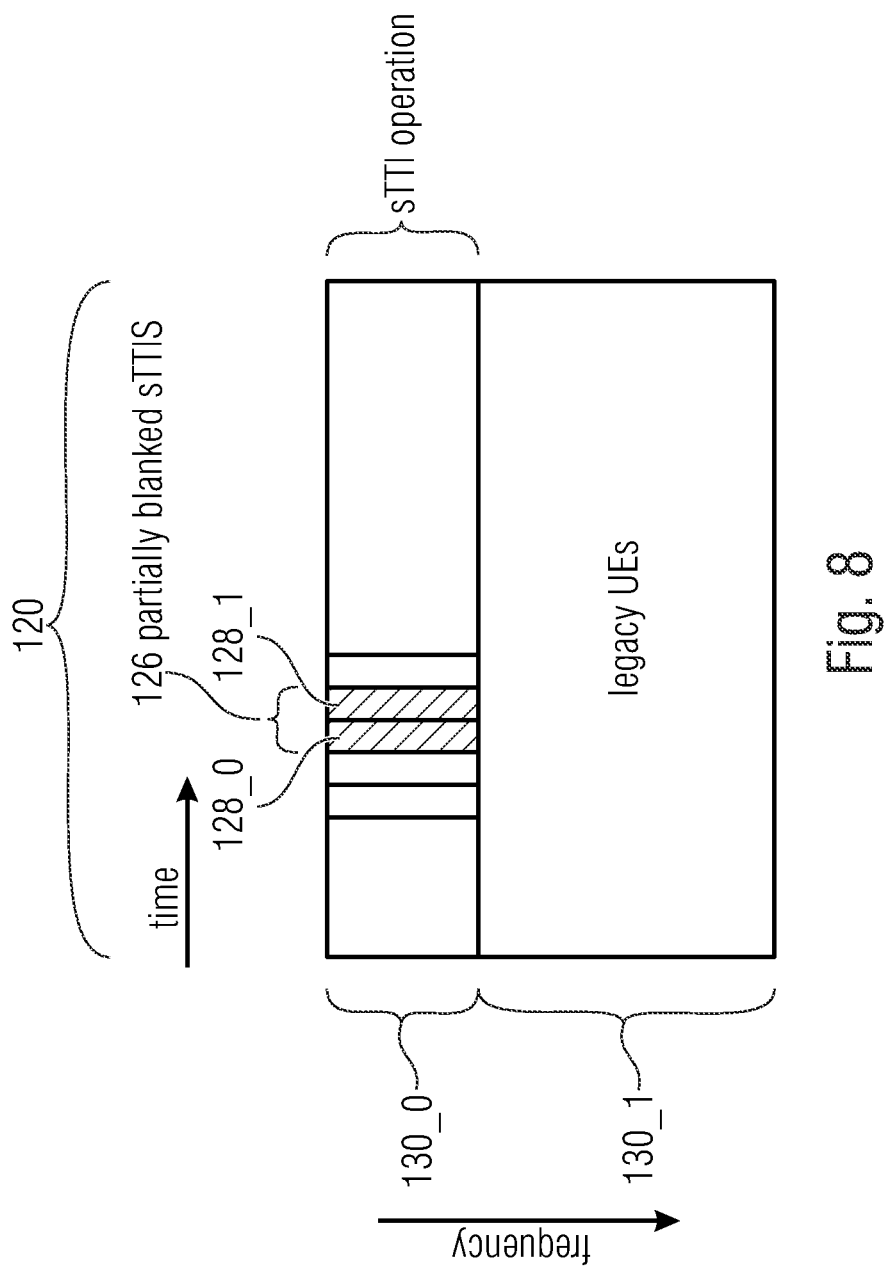

| IE/group name | presence | range | IE type and reference | semantics description | criticality | assigned criticality |
|---|---|---|---|---|---|---|
| Message Type | M | | 9.2.13 | | YES | ignore |
| Cell information | M | | | | YES | ignore |
| >Cell information item | | 1..<maxCellineNB> | | | EACH | ignore |
| >>Cell ID | M | | ECGI 9.2.14 | Id of the source cell | – | – |
| >>UL Interference Overload Indication | O | | 9.2.17 | | – | – |
| >>UL High Interference Information | | 0..<maxCellineNB> | | | – | – |
| >>Target Cell ID | M | | ECGI 9.2.14 | Id of the cell for which the HII is meant | – | – |
| >>UL High Interference Indication | M | | 9.2.18 | | – | – |
| >>Relative Narrowband Tx Power (RNTP) | O | | 9.2.19 | | – | – |
| >>ABS Information | O | | 9.2.54 | | YES | ignore |
| sICIC blank RE information DL | O | RE, groups of RE's, sTTI region | | | YES | ignore |
| sICIC blank RE information UL | O | RE, groups of RE's, sTTI region | | | YES | ignore |
| >>Invoke Indication | O | | 9.2.55 | | YES | ignore |
| >>Intended UL-DL Configuration | O | | ENUMERATED(sa0, sa1, sa2, sa3, sa4, sa5, sa6,...) | One of the UL-DL configurations defined in TS 36.211 [10]. The UL subframe(s) in the inducated configuration is subset of those in SIB1 UL-DL configuration. This IE applies to TDD only. | YES | ignore |
| >>Extended UL Interference Overload Info | O | | 9.2.67 | This IE applies to TDD only. | YES | ignore |
| >>CoMP Information | O | | 9.2.74 | | YES | ignore |
| >>Dynamic DL transmission information | O | | 9.2.77 | | YES | ignore |

Fig. 9

| sCIC blank RE information DL and transmit SRS | 0 | RE, groups of RE's, sTTI region | | | YES | ignore |
| sCIC blank RE information UL and transmit SRS | 0 | RE, groups of RE's, sTTI region | | | YES | ignore |

Fig. 12

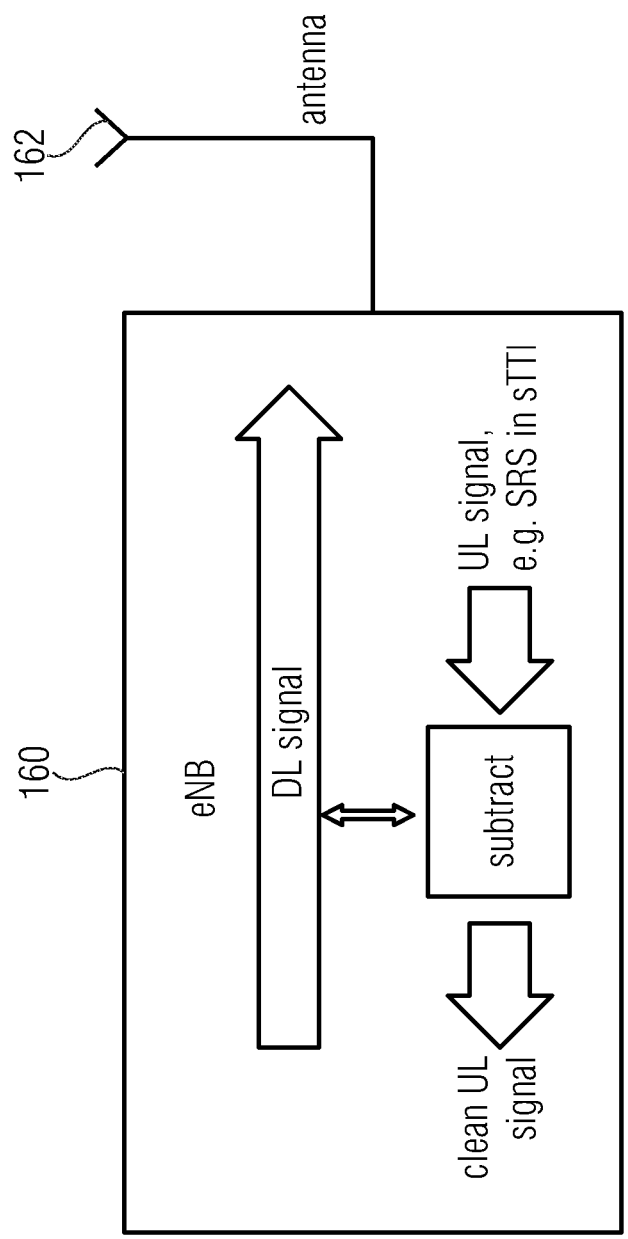

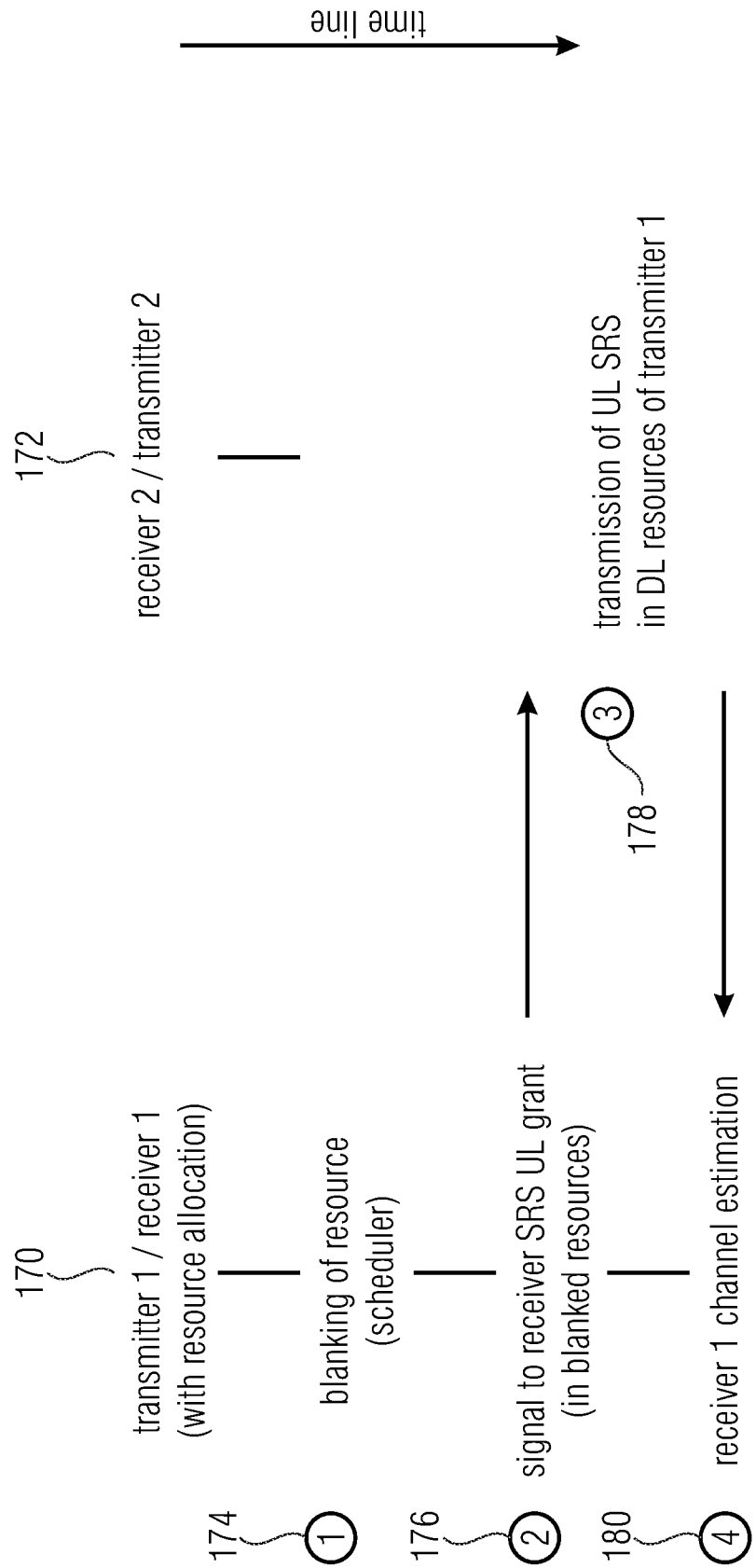

SOUNDING FEEDBACK UTILIZING SHORTENED FRAME STRUCTURES

CROSS-REFERENCES TO RELATED APPLICATIONS

This application is a continuation of copending U.S. patent application Ser. No. 16/271,438, filed Feb. 8, 2019, which in turn is a continuation of copending International Application No. PCT/EP2017/069815, filed Aug. 4, 2017, which is incorporated herein by reference in its entirety, and additionally claims priority from European Application No. EP 16 183 898.2, filed Aug. 11, 2016, which is incorporated herein by reference in its entirety.

BACKGROUND OF THE INVENTION

The present invention concerns the field of wireless communication systems, for example wireless mobile communication systems, in which data is transmitted from a transmitter to one or more receivers, like mobile terminals. The transmitters may be base stations of the wireless communication system or other mobile terminals. The receiver may be base stations of the wireless communication system or other mobile terminals. If transmitter and receiver is a mobile terminal, the communication link is referred to as sidelink.

Advanced MIMO systems with many antenna ports, such as Full Dimension (FD)-MIMO or massive MIMO systems, need fast and efficient feedback mechanisms to characterize the radio channel between base station (eNB) and user equipment (UE or uE). So-called channel state information (CSI) is used for choosing the best transmission strategy. Special sounding reference signals (SRS) can be used to estimate link (uplink, downlink, sidelink) channel quality over a wider bandwidth. With a high number of antenna ports, e.g. [16, 32, 64, >100] antenna ports, the number of resource elements (RE) used for transmitting feedback symbols increases, which results in a large overhead of symbols transmitted for control traffic, when compared to symbols available for transmitting data symbols. Thus, the overhead-to-data ratio becomes worse with an increasing number of antenna ports. Furthermore, accurate beamforming needs fast feedback in the reverse link, e.g. uplink (UL) or sidelink of the communication system, such that the collected channel state information from the particular UE is still "valid", implying that the signaling can be performed within the coherence time of the fading radio channel. In current frequency division duplex (FDD) systems, channel reciprocity (using the same frequency band also in UL direction and deriving CSI from the reciprocal link) cannot be utilized to derive CSI for the downlink (DL). Thus, the UE has to calculate CSI from the DL transmission and feed this information back in the UL direction. This needs the UE to store this feedback information (memory requirements), as well as waiting for an uplink slot (uplink grant) for transmitting CSI feedback in the UL. In TDD system, DL and UL subframe configuration is limited to the specified modes, including subframes used for switching (S) between DL and UL. The current TDD configurations limit channel feedback to the available reverse link (e.g. UL) time slot, which can lead to outdated CSI at the transmitter, which is waiting for this CSI to be used for precoding.

In summary, in both FDD and TDD systems, the current mechanisms may cause a feedback delay, resulting in outdated feedback at the transmitter, e.g. base station in the DL or terminal in a sidelink communication, if the channel has changed in the meantime, e.g. the feedback cannot be utilized at the transmitter within the coherence bandwidth of the fading channel. A resulting transmission with outdated CSI precoding will lead to inefficient or even loss of data packets in the data transmission and might cause an increased overhead, e.g. caused by resource elements used for retransmission protocols (such as hybrid automatic repeat request (HARQ)).

LTE sounding reference symbols (SRS) is a reference signal sent by the UE, which is used by the corresponding base station (eNB) to evaluate the channel quality of uplink path and uplink timing transmission, see 3GPP TS 36.211-§ 5.5.3 [1]. The UE sounding procedure is defined in 3GPP TS 36.213-§ 8.2 [2]. A UE shall transmit sounding reference symbol (SRS) on per serving cell SRS resources based on two different trigger types: higher layer signaling or based on specific DCI formats for FDD or TDD systems. SRS may be transmitted as 'single' or 'periodic' information. The periodicity ranges from 2 ms to 320 ms. In addition, the used SRS bandwidth, hopping bandwidth, the frequency domain position of SRS, a cyclic shift to generate up to 8 different, orthogonal SRS sequences. Furthermore, a 'transmission-Comb' can be specified which allows to multiplex two UEs with the same cyclic shift in alternating frequency and time resources.

The sequence of SRS's use same sequences used for the uplink demodulation reference signals (DMRS). Since the cyclic shift versions of the Zadoff-Chu sequence are orthogonal, several UEs (up to 8) can transmit using different cyclic shifts on the same physical radio resource.

The sounding reference signal shall be transmitted in the last symbol of the uplink subframe. An example is shown in FIG. 1.

In detail, FIG. 1 shows in a diagram the uplink subframe (SF) structure of the LTE resource grid. Thereby, the ordinate denotes frequency domain and the abscissa the time domain. As shown in FIG. 1, the dime domain is subdivided into subframes 10_0 to 10_9 (SF0 to SF9), each subframe 10_0 comprising two slots 12_0 and 12_1, each slot comprising seven symbols 14_0 to 14_6. The frequency domain is subdivided into physical resource blocks 16_0 to 16_5 (PRB0 to PRB5), each physical resource block 16_0 comprising 12 sub carriers 18_0 to 18_11. Thereby, one resource element is defined by one symbol and one sub carrier. As shown in FIG. 1, the sounding reference symbols 20_0 to 20_4 can be transmitted in the last symbol of subframes SF1, SF3, SF, SF7 and SF9 in physical resource blocks PRB1 to PRB4.

In other words, FIG. 1 shows a graphical view of SRS (highlighted resource elements 20_0 to 20_4) in one uplink radio frame (10 ms, 1.4 MHz bandwidth), [3].

In TDD (see also the below described LTE radioframe structure), SRS can be transmitted in uplink as well as in special subframes (UpPTS). Based on the special subframe configuration (Table 4.2-1 from 36.211), the UpPTS length varies (one or two OFDM symbols). When one single carrier-FDMA (SC-FDMA) symbol exists in UpPTS, it can be used for SRS transmission. When two SC-FDMA symbols exist in UpPTS, both can be used for SRS transmission and both can be assigned to the same UE. In UpPTS, whenever SRS transmission instance overlaps with the physical random access channel (PRACH) region for preamble format 4, the UE shall not transmit SRS.

Subsequently, the LTE radioframe structure is described. In LTE Releases 13 and earlier, a subframe is equal to the transmission time interval (TTI) of the system which is 1 ms, as shown in FIG. 2. The standard currently supports 3 frame structure types.

In detail, FIG. 2 shows in a diagram the LTE type 1 FDD frame structure in the time domain. One radio frame 20 has the duration of 10 ms and is subdivided into 10 subframes 10_0 to 10_9. Each subframe 10_0 is subdivided into two slots 12_0 and 12_1, each slot having the duration of 0.5 ms.

In other words, FIG. 2 shows subframes within the LTE frame structure type 1 (FDD), see 3GPP TS 36.211.

FIG. 3 shows in a diagram the LTE type 2 TDD frame structure in the time domain (timing of the transmission time interval (TTI) structure). Thereby, the ordinate denotes different uplink/downlink configurations and the abscissa the time domain. In FIG. 3, two radio frames 10_0 and 10_1 (SFN (N) and SFN (N+1)) are shown, each subframe 10_0 comprising 10 sub frames (where SFN refers to the subframe number). Downlink slots are indicated with D, uplink slots are indicated with U, switching points are indicated with S. Further, in FIG. 3 guards 22 between downlink slots and uplink slots are shown.

In other words, FIG. 3 shows LTE TDD modes (UL/DL configurations) with switching periods (guards).

In LTE type 3 an aggregated frame structure, consisting of a set of frame structures of type 1 and/or type 2, utilizing licensed shared access schemes (LAA) applicable for LAA secondary cell operation with normal cyclic prefix is used.

SUMMARY

An embodiment may have a transceiver, wherein the transceiver is configured to receive data in at least one transmission time interval on certain allocated resource elements of a wireless communication system; wherein the transceiver is configured to at least partially blank a transmission time interval; wherein the transceiver is configured to receive from another transceiver a transmission grant in a blanked part of the at least partially blanked transmission time interval, wherein the transceiver is configured to receive data using a data signal, the data signal including a plurality of frames, each frame including a plurality of subframes, and each subframe including a number of symbols in the time domain and a number of sub-carriers in the frequency domain, wherein the transmission time interval is defined by a predefined number of symbols in the time domain, wherein the transmission time interval is shorter than one subframe.

According to another embodiment, a method may have the steps of: receiving data in at least one transmission time interval on certain allocated resource elements of a wireless communication system; at least partially blanking a transmission time interval; and receiving from another transceiver a transmission grant in a blanked part of the at least partially blanked transmission time interval, wherein the data is received using a data signal, the data signal including a plurality of frames, each frame including a plurality of subframes, and each subframe including a number of symbols in the time domain and a number of sub-carriers in the frequency domain, wherein the transmission time interval is defined by a predefined number of symbols in the time domain, wherein the transmission time interval is shorter than one subframe.

Another embodiment may have a non-transitory digital storage medium having a computer program stored thereon to perform the inventive method for transmitting when said computer program is run by a computer.

Embodiments provide a transceiver, wherein the transceiver is configured to transmit or receive data in at least one transmission time interval on certain allocated resource elements of a wireless communication system, wherein the transceiver is configured to at least partially blank a transmission time interval for a data block to be transmitted or received by the transmitter, wherein the transceiver is configured to at least one out of (a) signal to another transceiver a transmission grant in a blanked part of the at least partially blanked transmission time interval and (b) to at least partially blank the transmission time interval based on a blanking pattern received from another transceiver.

For example, the (partially) transmission time interval can be used to embed the reference signal (e.g., sounding reference signals (SRS)) in downlink (DL), uplink (UL) or sidelink (SL) direction, as well as in reciprocal transfer of UL SRS in a DL band, e.g., for channel state information (CSI) pre-coding in a frequency division duplexing (FDD) band.

In embodiments, the transceiver can be a transceiver of a first type, such as a base station (eNB) of the wireless communication system. Optionally, the transceiver may also be a mobile terminal (uE) or sidelink device of the wireless communication system.

In embodiments, the transceiver can be configured to transmit or receive data using a data signal, the data signal comprising a plurality of frames, each frame including a plurality of subframes, and each subframe having a number of symbols in the time domain and a number of sub-carriers in the frequency domain, wherein the transmission time interval can be defined by a predefined number of symbols in the time domain.

Thereby, the transmission time interval can be shorter than one subframe (e.g., two slots).

In embodiments, the transceiver can be configured to at least partially blank the transmission time interval by blanking at least a subset of symbols in the time domain of the transmission time interval.

In embodiments, the transceiver can be configured to at least partially blank the transmission time interval by blanking at least a subset of sub-carriers in the frequency domain of the transmission time interval.

In embodiments, the transceiver can be configured to at least partially blank the transmission time interval by blanking at least a subset of resource elements of the transmission time interval in at least one out of time domain and frequency domain.

For example, transmission time interval blanking can be performed up to symbol level in the time domain, on subcarrier or physical resource block level in frequency domain, or in any combination of time, frequency and spatial domains.

In embodiments, the transceiver can be configured to signal to another transceiver a transmission grant for transmitting a reference signal in a blanked part of the at least partially blanked transmission time interval.

For example, the transceiver can be configured to signal the transmission of the reference signal (e.g., SRS sequence) by the other transceiver (e.g, uE or mobile device) in this area. Thereby, the blanking does not have to be signaled in downlink as the transceiver (e.g., eNB or base station) may just leave this empty.

For example, the transceiver can be configured to signal to the other transceiver a blanking grid, wherein the other transceiver may decide whether to transmit the reference signal (e.g., uplink sounding reference signals (SRS)) in the blanked parts of the transmission time interval based on the signaled blanking grid.

In embodiments the transceiver can be configured to use a downlink control channel to signal the transmission grant.

For example, the transceiver (e.g., base station) can be configured to perform DL signaling of blanking patterns to the other transceiver (e.g., uE) using signaling over the DL control channels, e.g. PDCCH.

In embodiments, the transceiver can be configured to blank at least one out of demodulation reference symbols and data symbols in the at least partially blanked transmission time interval.

For example, no demodulation reference symbols (DRMS) and no data symbols may be transmitted by the transceiver during a specific transmission time interval in time and frequency domains.

In embodiments, the transceiver can be configured to blank all symbols of the transmission time interval.

For example, the transceiver can be configured to perform a full blanking of the transmission time interval in at least one out of frequency domain and time domain, e.g., in both of frequency domain and time domain.

In embodiments, the transceiver can be configured to only transmit at least one out of reference symbols and demodulation reference symbols in the at least partially blanked transmission time interval.

Thereby, the transceiver can be configured to not transmit at least one out of data symbols and control symbols in the at least partially blanked transmission time interval.

For example, the transceiver can be configured to perform data and control channel blanking. Only reference symbols (RS) may be transmitted, resource elements (RE) for data or control channels are left empty to reduce interference or to leave it to each uE optional to decode RS/DMRS symbols.

In embodiments, the transceiver can be configured to partially blank parts of the transmission time interval in at least one part out of time domain and frequency domain.

For example, the transceiver can be configured to perform a partial blanking of parts of the transmission time interval in the time domain, to perform a partial blanking of parts of the transmission time interval in the frequency domain, or to perform a combination of both.

In embodiments, the transceiver can be configured to use a blanked part of the at least partially blanked transmission time interval for transmitting or receiving a reference signal.

For example, the reference signal (e.g., pilot symbols or reference symbols) can be designated to enable the transceiver (e.g., base station) or the other transceiver (e.g., mobile device) to estimate the channel. Thereby, the reference signal may be known to both transceivers.

The transceiver can be configured to at least partially blank a transmission time interval for a data block to be transmitted by the transceiver in a downlink band or during downlink time interval of the wireless communication system, wherein the transceiver can be configured to use a blanked part of the at least partially blanked transmission time interval for receiving a reference signal from the other transceiver in the downlink band or during the downlink time interval of the wireless communication system.

The transceiver can be configured to blank at least one out of a data channel and a control channel in the transmission time interval, wherein the transceiver can be configured to use the blanked channel of the transmission time interval to transmit a reference signal to the other transceiver.

For example, additional reference signals can be embedded in the downlink control and/or data channel to support channel estimation at the other transceiver (e.g., uE) for a larger set of transmit antennas within a smaller time duration.

The transceiver can be configured to at least partially blank a downlink transmission time interval, wherein the transceiver can be configured to use a blanked part of the at least partially blanked downlink transmission time interval for receiving an uplink reference signal from the other transceiver in the downlink transmission time interval in the downlink frequency band.

Thereby, the transceiver can be configured to use channel reciprocity to estimate properties of the communication channel from the other transceiver to the transceiver based on the received uplink reference signal, wherein the transceiver can be configured to precode data to be transmitted to the other transceiver in a subsequent transmission time interval based on the estimated properties of the communication channel from the other transceiver to the transceiver.

The transceiver can be configured to signal to the other transceiver the parts of the at least partially blanked downlink transmission time interval to be used by the other transceiver to transmit the uplink reference signal.

The transceiver can be configured to use a blanked part of the at least partially blanked downlink transmission time interval for receiving at least two uplink reference signals from at least two other transceivers in the downlink transmission time interval in the downlink frequency band, wherein at least two uplink reference signals are orthogonal to each other.

The transceiver can be configured to signal to another transceiver of another cell of the communication system a transmission grant in a blanked part of the at least partially blanked transmission time interval, or to signal to another transceiver of another cell of the communication system a blanking pattern used for at least partially blanking the transmission time interval.

The transceiver can be configured to use a blanked part of the at least partially blanked transmission time interval for transmitting or receiving a control information.

Thereby, the control information is a MIMO feedback information.

For example, a MIMO feedback information can be a antenna port to be used by the transmitter, a matrix index (PMI) of a corresponding precoding matrix, or a rank indication (RI) of the MIMO channel matrix.

In embodiments, the transceiver can be a base station in the wireless communication system, and the data signal is an IFFT based signal, the IFFT based signal having a plurality of frames, the frame including a plurality of sub-frames.

For example, the IFFT (inverse fast Fourier transform) based signal may include OFDM with CP or DFT-s-OFDM with CP and IFFT-based waveforms without CP. For example, OFDM with CP may be used for downlink transmission. For example, DFT-s-OFDM with CP may be used for uplink transmission.

In embodiments the transceiver can be configured to receive the blanking pattern from an interference optimization terminal, the blanking pattern indicating to blank a resource element based on the transmission time interval.

For example, the interference optimization terminal can be an external entity (e.g., a SON=Self Organizing Network) configured to signal to the transceiver (e.g. base station) to blank a resource based on the shortened transmission time interval. The interference optimization terminal can be an external optimization engine attached to the base station (SON=Self Organizing Network), which communicates with the base station to optimize interference levels.

Further embodiments provide a transceiver, wherein the transceiver is configured to transmit or receive data in at least one transmission time interval on certain allocated resource elements of a wireless communication system, wherein the transceiver is configured to transmit a reference signal in a blanked part of a at least partially blanked transmission time interval for a data block to be received by the transceiver.

In embodiments, the transceiver can be a transceiver of a second type, such as mobile terminal (uE) of the wireless communication system. Optionally, the transceiver also may be a base station (eNB) or sidelink device of the wireless communication system.

In embodiments, the transceiver can be configured to transmit or receive data using a data signal, the data signal comprising a plurality of frames, each frame including a plurality of subframes, and each subframe having a number of symbols in the time domain and a number of sub-carriers in the frequency domain, wherein the transmission time interval is defined by a predefined number of symbols in the time domain.

In embodiments, the transceiver can be the transmission time interval can be shorter than one subframe.

In embodiments, the transceiver can be configured to transmit the reference signal to another transceiver in a blanked part of the at least partially blanked transmission time interval based on a transmission grant signaled by the other transceiver, the transmission grant indicating the blanked part of the at least partially blanked transmission interval to be used for transmitting the reference signal.

In embodiments, at least a subset of symbols of the at least partially blanked transmission time interval can be blanked in the time domain.

In embodiments, at least a subset of sub-carriers in the frequency domain of the transmission time interval are blanked.

In embodiments, at least a subset of resource elements of the transmission time interval is blanked in at least one out of time domain and frequency domain.

In embodiments, a transmission time interval for a data block to be received by the transceiver in a downlink band or downlink time interval of the wireless communication system is at least partially blanked, wherein the transceiver is configured to use a blanked part of the at least partially blanked transmission time interval for transmitting the reference signal.

In embodiments, at least one out of a data channel and a control channel of the transmission time interval are blanked, wherein the transceiver is configured to use the blanked channel of the transmission time interval to transmit the reference signal.

In embodiments, a downlink transmission time interval is at least partially blanked, wherein the transceiver can be configured to use a blanked part of the at least partially blanked downlink transmission time interval for transmitting an uplink reference signal to another transceiver in the downlink transmission time interval in the downlink frequency band or downlink time interval.

For example, in a FDD system different uplink und downlink band may be used, wherein an uplink feedback transmission can be performed in a blanked part of the downlink resources. In a TDD system the same uplink und downlink band may be used, wherein an uplink feedback transmission can be performed in a blanked part of the downlink resources.

In embodiments, the transceiver can be configured to receive a signal information indicating the parts of the downlink transmission time interval to be used by the transceiver to transmit the uplink reference signal.

In embodiments the transceiver can be configured to use a blanked part of the at least partially blanked transmission time interval for transmitting or receiving a control information.

Thereby, the control information can be a MIMO feedback information.

In embodiments, the transceiver can be a mobile terminal in the wireless communication system, and the data signal is an IFFT based signal, the IFFT based signal having a plurality of frames, the frame including a plurality of subframes.

For example, the IFFT (inverse fast Fourier transform) based signal may include OFDM with CP or DFT-s-OFDM with CP and IFFT-based waveforms without CP. For example, OFDM with CP may be used for downlink transmission. For example, DFT-s-OFDM with CP may be used for uplink transmission.

BRIEF DESCRIPTION OF THE DRAWINGS

Embodiments of the present invention will be detailed subsequently referring to the ap-pended drawings, in which:

FIG. 7a shows in a diagram an example of a downlink subframe with a partial blanking of a sTTI;

FIG. 7b shows in a diagram an example of a downlink sTTI having a length of two OFDM symbols;

FIG. 7c shows in a diagram an example of a downlink sTTI having a length of seven OFDM symbols;

FIG. 8 shows in a diagram an example of a downlink subframe with a partial sTTI blanking;

FIG. 9 shows in a table messages that can be used between a set of base stations (n=number of base stations=n NBs) for coordinating interference by aligning blanking patterns to optimize overall network performance;

FIG. 12 shows in a table a sICIC message configuration;

FIG. 13 shows a schematic block diagram of a full duplex operation of an eNB 160;

FIG. 14 shows a flowchart of an operation of a communication system with uplink feedback in blanked sTTI's;

DETAILED DESCRIPTION OF THE INVENTION

In the following, embodiments of the present invention are described in further detail with reference to the enclosed drawings in which elements having the same or similar function are referenced by the same reference signs.

Figure 1:
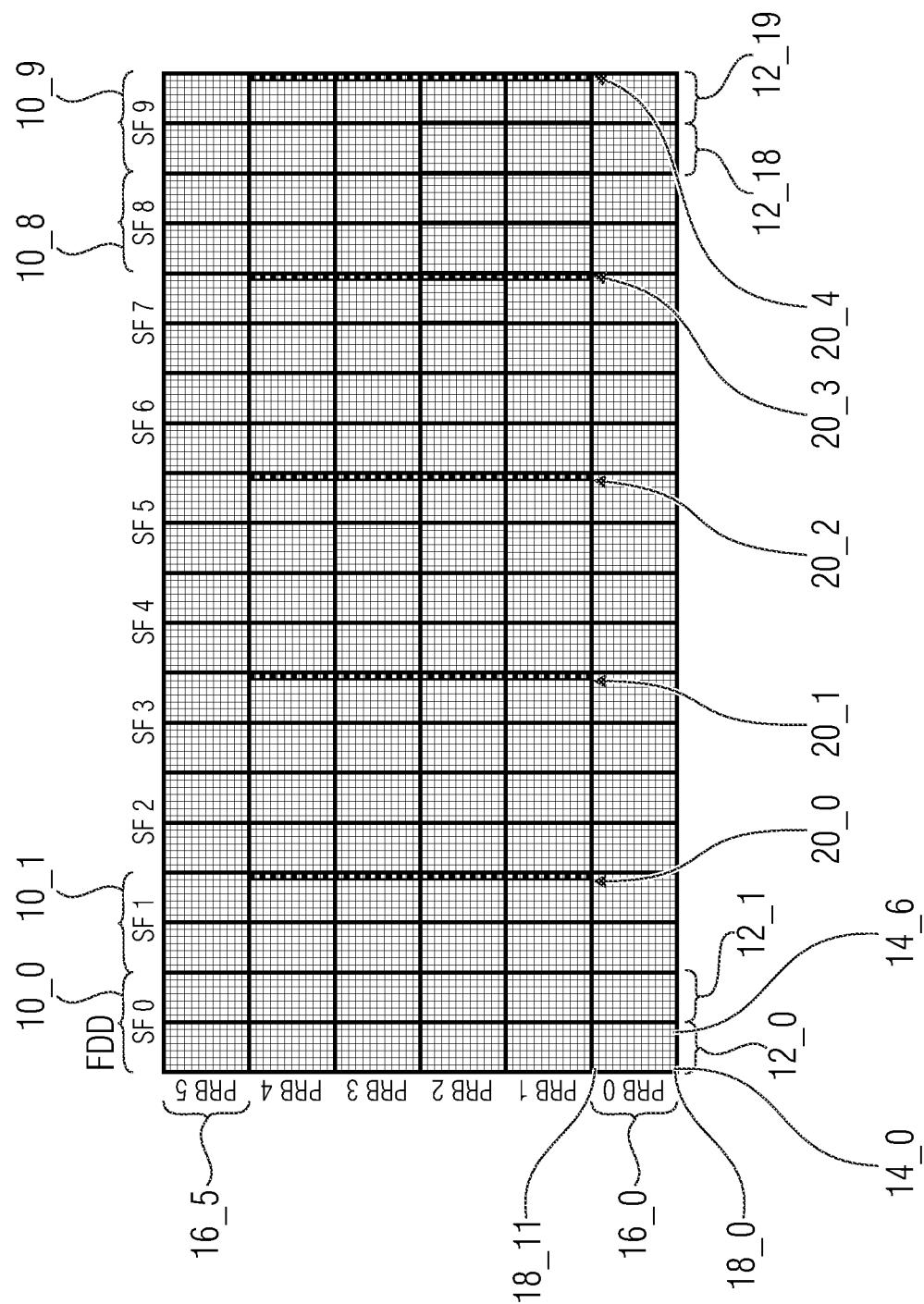
FIG. 1 shows in a diagram the uplink subframe structure of the LTE resource grid.
Figure 2:
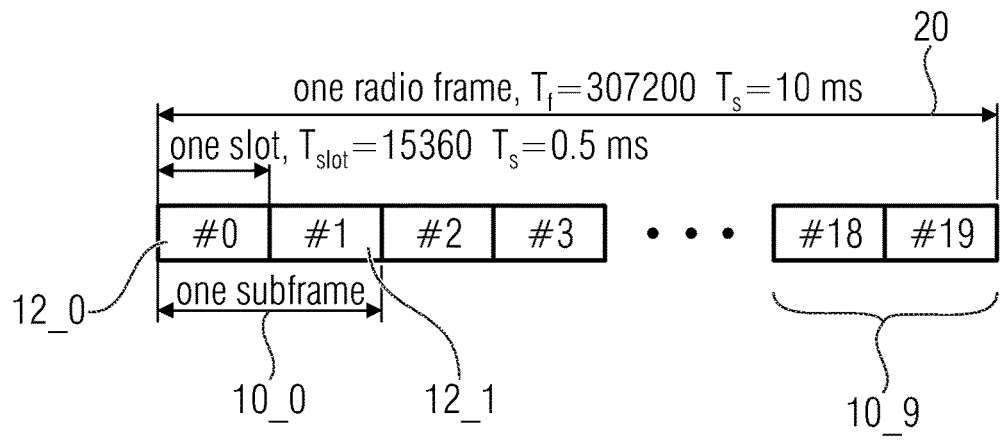
FIG. 2 shows in a diagram the LTE type 1 FDD frame structure in the time domain.
Figure 3:
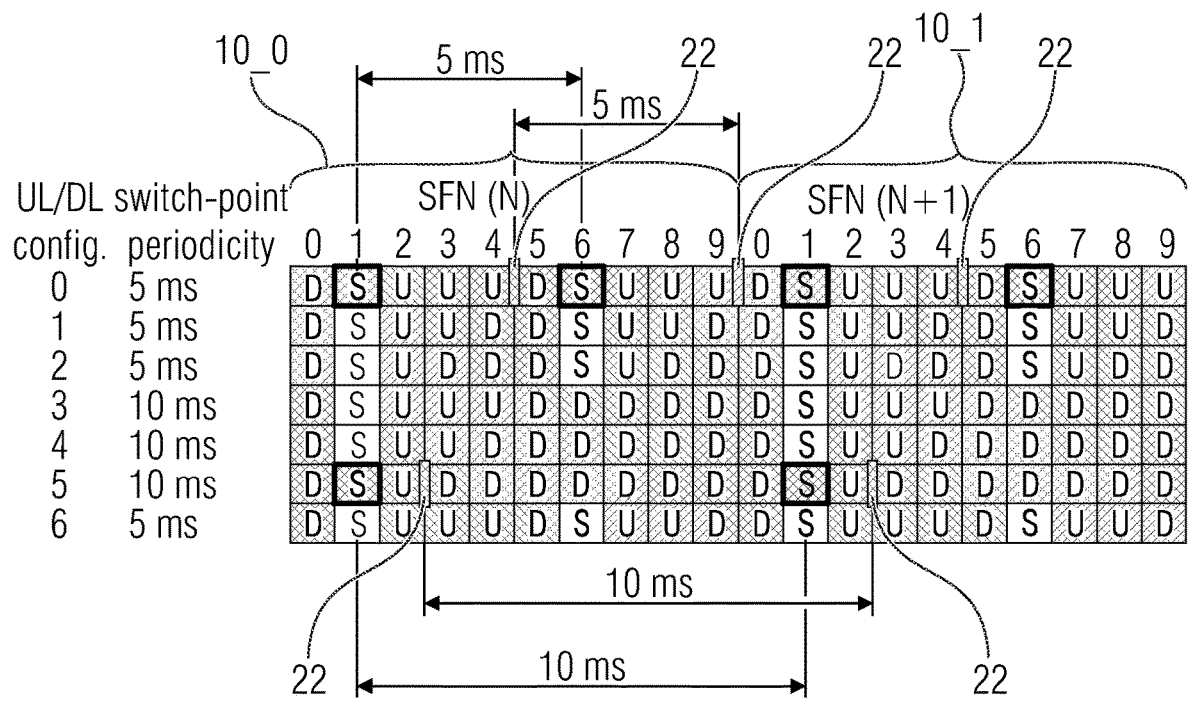
FIG. 3 shows in a diagram the LTE type 2 TDD frame structure in the time domain.
Figure 4:
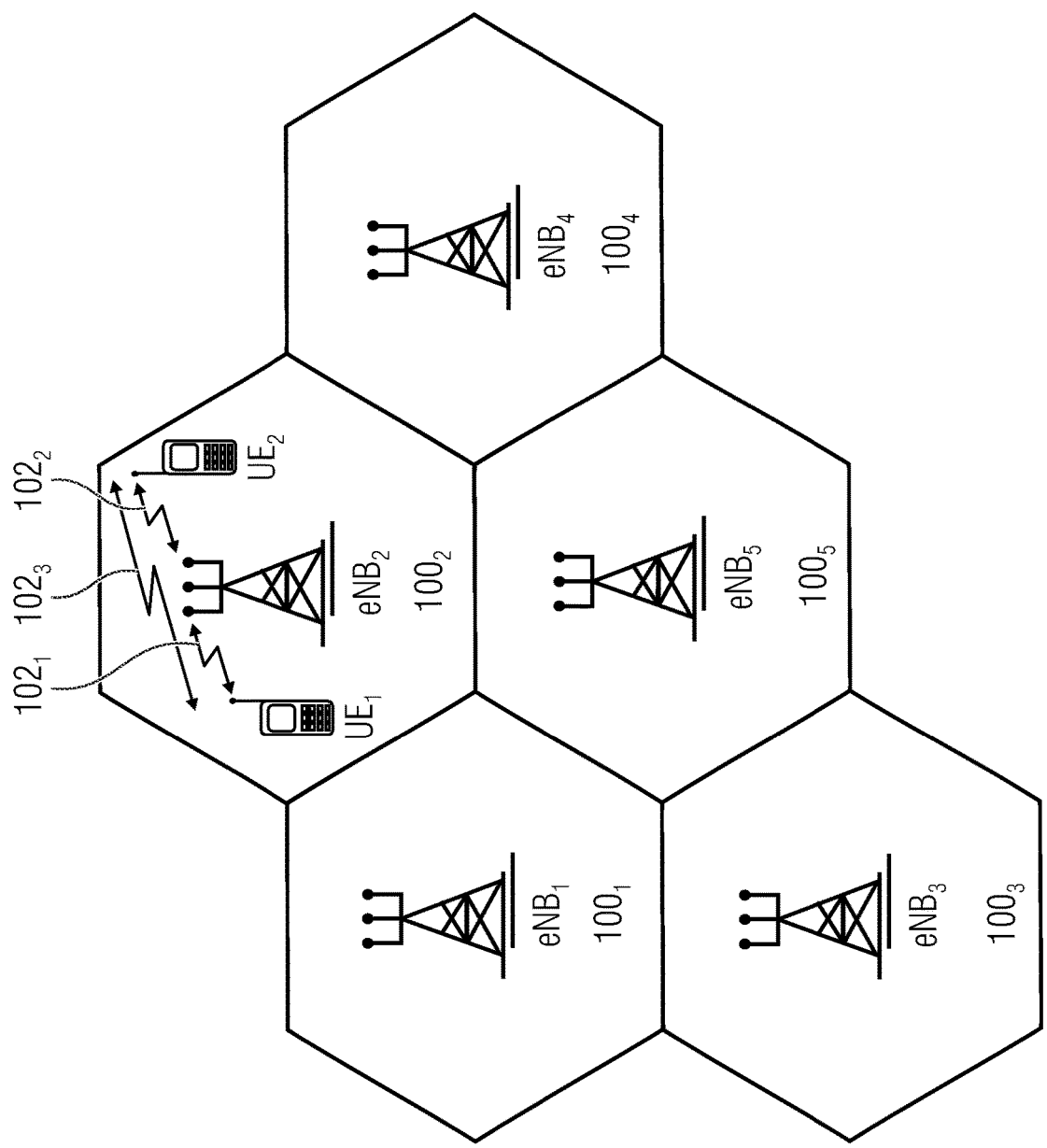
FIG. 4 shows a schematic representation of an example of a wireless communication system including a plurality of base stations.

A data transmission in a wireless communication system, like an IFFT-based (e.g. OFDMA) system as depicted in FIG. 4, may use a resource grid structure as shown in FIG. 2. The TTI, also referred to as transmission time interval, is selected to be 1 millisecond which is the duration of the subframe, also referred to as data signal block. A receiver, like a mobile user, processes the data with a granularity of 1 millisecond, i.e., each millisecond the receiver, which is synchronized with the radio network, processes the control information. In case processing the control information shows that data is designated for the receiver, the data channel is decoded. There may be situations, for example extreme real-time communication use cases, like ultra-low delay (ULD) services, where an end-to-end latency needs to be reduced to 1 millisecond or less. When the receiver processes the data with a granularity of 1 millisecond, a reduction of the end-to-end latency is not achievable. A latency reduction to 1 millisecond or less may bring significant benefits in terms of throughput increase, for example in file transfer protocol (FTP)/transmission control protocol (TCP) transmissions for optimizing TCP-Acknowledgement messages in the TCP slow start mode and may also lead to a faster processing at the application layer. In the example of FIG. 2 the sub-frame has a sTTI length of two OFDM symbols.

Figure 5:
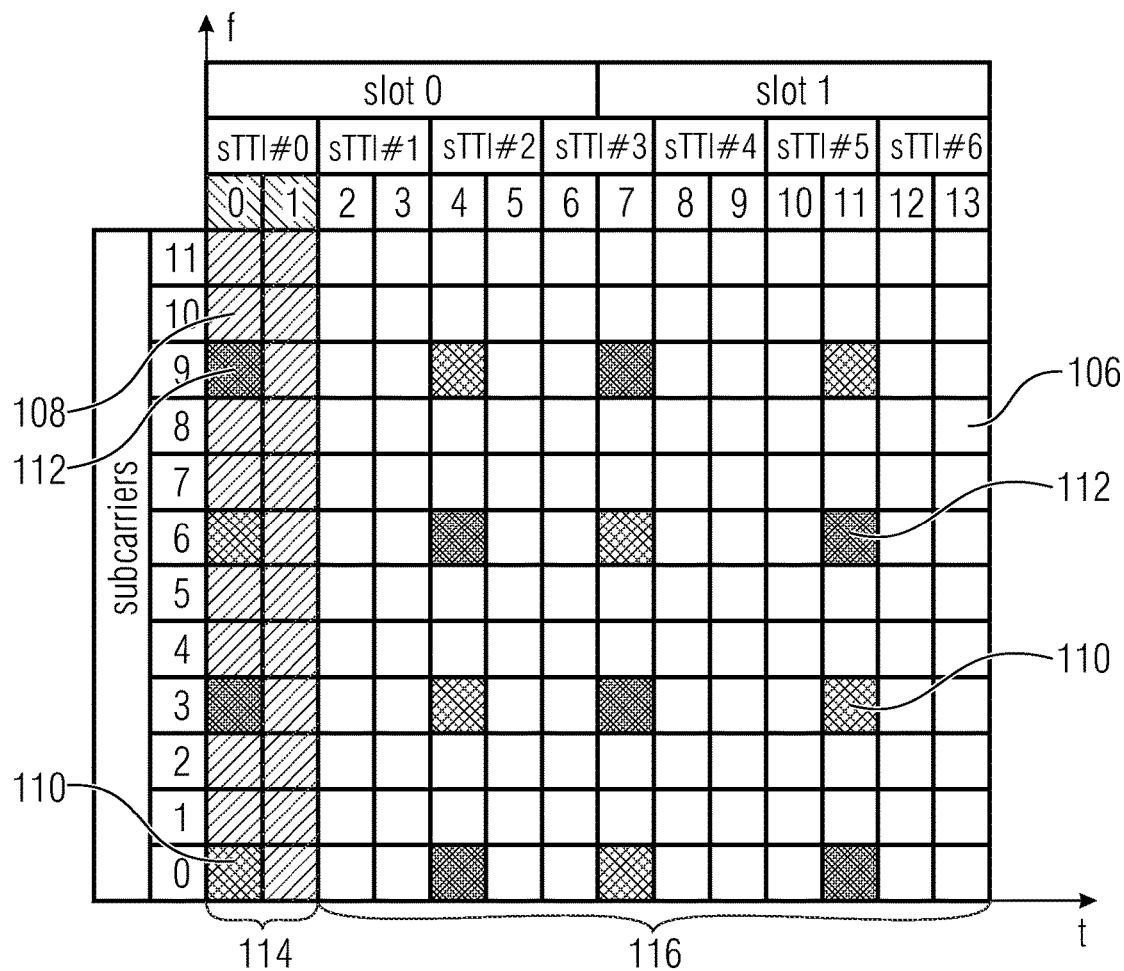
FIG. 5 shows an example of an OFDMA-subframe for two antennas ports as it may be used for a conventional LTE downlink communication.

In FIG. 5, the area defined by a plurality of the resource elements 106 of the OFDM symbols 0 and 1 is referred to as a control region 114 of the data signal block, and the remaining symbols 2 to 13 are referred to as a payload region 116. The control region 114 is used to transmit control data to the UE, for example in the PDCCH, the PCFICH and the PHICH. A number of resource elements in the control region is allocated to the PCFICH, and a number of resource elements is allocated to the PHICH. Further resource elements of the control region are allocated to the PDCCH. The PDCCH may carry control data for the uplink/downlink communication between the user equipment (UE) and the base station and for operating the UE. The control region may also transmit reference signals 110. Some resource elements may not be used, for example, resource elements 112. The control region 114 is also referred to as the control channel of the subframe.

For FDD and TDD systems, a novel radio frame structure is currently under discussion for a better support traffic for ultra-reliable low latency communications (URLLC). However, by introducing the short TTI (sTTI) concept in future LTE releases, see e.g. the 3GPP working item on latency reduction, the restriction to subframe sizes can be overcome. The current working assumption for future LTE Release 14 is to allow the sTTI concept with the following configurations for:

FDD Systems:
Downlink (PDSCH), working assumption: sTTI with 2, 3-4, 7 OFDM symbols (OS)
Uplink (PUSCH), working assumption: sTTI with 2, 3-4 OFDM symbols (OS)
TDD System Working Assumption:
1-slot (=7 OFDM symbols) sTTI for sPDSCH/sPDCCH/sPUSCH/sPUCCH In future mobile communication standards referred to as New Radio (NR) or 5G, the length of a TTI may be reduced to support a shortened version of only 1 OFDM symbol or at least the configurations described above, which are proposed for URLLC in LTE Rel. 14.

Blanking in URLLC Frame Structure

Similar to subframe blanking, allow blanking of shortened TTI's (sTTI) depending on the current sTTI configuration. This can be operated in downlink (DL) as well as in uplink (UL) direction. sTTI blanking can be used for inter-cell interference coordination (ICIC) up to OFDM symbol level in the time domain, on subcarrier or physical resource block (PRB=12 subcarriers in LTE) level in frequency domain, or in any combination of time, frequency and spatial domains. The combination of sTTI and ICIC can be defined as sICIC.

The base station can implement DL signaling of blanking patterns from the eNB to the UE using signaling over the DL control channels, e.g. PDCCH.

sICIC: sTTI Blanking

In general, sICIC shall support blanking of sTTI's by signaling to UEs to discard sTTI's identified by a sTTI number. In this blanking period, a UE may use the discontinuous reception (DRX)-mode to save battery power or listen to specific sTTI's containing reference symbols (RS) or demodulation reference symbols (DMRS) or specific control channels, e.g. short PDCCH (sPDCCH), or any combination of RS and/or sPDCCH. Blanking may include the following described modes.

The following describes the sTTI blanking schemes and modes to be supported by sICIC:

A first mode includes full blanking. Thereby, no DRMS and no data symbols are transmitted and/or received during a specific sTTI in time and frequency domains.

A second mode includes data and control channel blanking (RS only). Thereby, only RS are transmitted, resource elements (RE) for data or control channels are left empty to reduce interference or to leave it to each UE optional to decode RS/DMRS symbols.

A third mode includes mixed blanking. Thereby, each sTTI which contains RS/DMRS, transmit RS/DMRS symbols and also map RE's for user data of a shortened data packet in DL or UL direction (sPDSCH or sPUSCH) or control channels (sPDCCH) into blank RE's.

A fourth mode includes partial blanking, using different blanking patterns, such as partial blanking of parts of the sTTI in time domain, partial blanking of parts of the sTTI in frequency domain, or a combination of both.

A fifth mode, where blanking is performed in a sidelink communication between two or more terminals, where resources are blanked based on sTTI's in time and or frequency domain.

Figure 6:
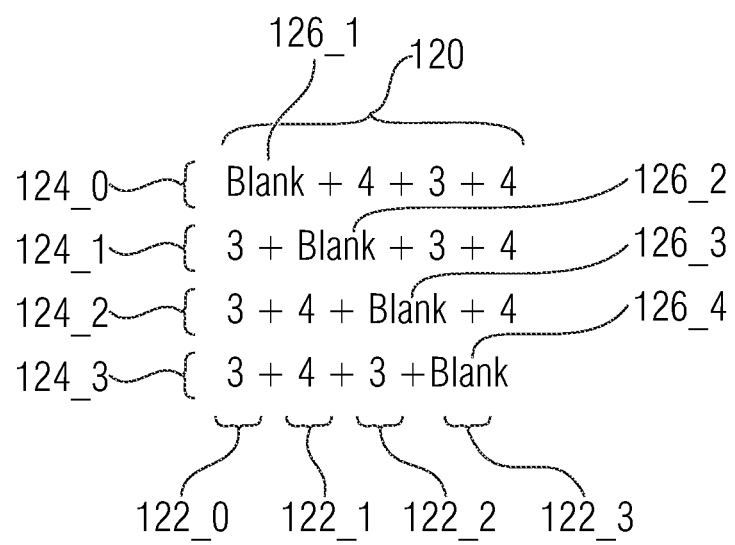
FIG. 6 shows in a diagram an example of four different configurations (modes) of a downlink subframe with blanking of sTTI's on different time positions.

FIG. 6 shows in a diagram an example of four different configurations (modes) of a downlink subframe 120. In FIG. 6, the ordinate denotes the four different configurations of the downlink subframe 120 and the abscissa the time domain. The subframe 120 can comprise 14 OFDM symbols. The subframe 120 can be divided into four sections, the first section 122_0 including three OFDM symbols, the second section 122_1 including four OFDM symbols, the third section 122_2 including three OFDM symbols, and the fourth section 122_3 including four OFDM symbols.

As shown in FIG. 6, In the first mode 124_0, the blanked sTTI can include the 3 OFDM symbols of the first section 122_0. In the second mode 124_1, the blanked sTTI can include the 4 OFDM symbols of the second section 122_1. In the third mode 124_2, the blanked sTTI can include the 3 OFDM symbols of the third section 122_2. In the fourth mode 124_3, the blanked sTTI can include the 4 OFDM symbols of the fourth section 122_3.

In other words, FIG. 6 shows a partial blanking in sTTI modes, e.g., for the sTTI 3+4 OFDM symbol (OS) operation.

FIG. 7a shows in a diagram an example of a downlink subframe 120 with a partial blanking of a sTTI 126. In FIG. 7a the ordinate denotes the frequency domain and the abscissa the time domain. The (partially) blanked sTTI 126 may comprise a length of two OFDM symbols. Naturally, also other lengths are possible, such as three, four or seven OFDM symbols. As described in further detail below, the (partially) blanked sTTI of the downlink subframe 120 can be used as uplink feedback, for example, for an uplink transmission of channel feedback, e.g. CSI or RS or DMRS or pilot sequences.

FIG. 7b shows in a diagram an example of a downlink sTTI 126 having a length of two OFDM symbols 128_0 and 128_1. In FIG. 7b the ordinate denotes the frequency domain and the abscissa the time domain. A first OFDM symbol 128_0 of the sTTI 126 can be used as guard interval, wherein a second OFDM symbol 128_1 of the sTTI 126 can be used as uplink feedback, for example, for an uplink transmission of CSI or RS or DMRS of one uE or more than one uE if a multiplexing scheme, such as FDMA, is used.

FIG. 7c shows in a diagram an example of a downlink sTTI 126 having a length of seven OFDM symbols 128_0 to 128_6. In FIG. 7b the ordinate denotes the frequency domain and the abscissa the time domain. First to third OFDM symbols 128_0 to 128_2 of the sTTI 126 can be used as guard interval, wherein fourth to seventh OFDM symbols 128_3 to 128_6 of the sTTI 126 can be used as uplink feedback, for example, for an uplink transmission of CSI or RS or DMRS of one uE or more than one uE if a multiplexing scheme, such as TDMA and/or FDMA, is used.

In other words, FIGS. 7a to 7c show sICIC, i.e. sTTI blanking (depending on sTTI configuration), blanking of sTTI or groups of sTTI's. As described in further detail below, blanked symbols can be used for uplink feedback, e.g., multiplexing of uplink channel state information (CSI) or sounding reference signals (SRS) if multiple users transmit feedback in blanked sTTI('s).

FIG. 8 shows in a diagram an example of a downlink subframe 120 with a partial sTTI 126 blanking. In FIG. 8 the ordinate denotes the frequency domain and the abscissa the time domain. As shown in FIG. 8, a first subband 130_0 is reserved for sTTI operation and a second subband 130_1 is reserved for legacy uEs. The (partially) blanked sTTI 126 may have a length of, for example, two OFDM symbols 128_0 and 128_1 (only) in the first subband 130_0.

In other words, FIG. 8 shows a partial blanking of sTTI's in subband with shortened TTI traffic in a predefined part of the LTE radioframe.

sICIC Signaling Over X2

In a multi-cellular environment, neighboring base stations can coordinate interference by aligning blanking patterns to optimize overall network performance. For sICIC operation in a multi-cellular context at least one out of the following messages can be used.

For example, a sICIC message can be used, similar to messages in eICIC/feICIC to support exchange of blanking patterns between base stations over the interface between eNBs (e.g. X2 interface).

Further, a message for inter-base station signaling can be used, similar to almost blank subframe (ABS) field, such as (a) blank resource elements (REs)/group of REs, (b) blank sTTI region, and (c) reduce power in sTTI region.

Furthermore, a message with timing alignment information between neighboring eNBs can be used, such that blanking schemes are synchronous in time domain.

The above messages can be sent by an eNB to neighboring base stations (eNBs) to transfer load and interference co-ordination information, refer to 3GPP TS 36.423, sect. 9.1.2.1 [5].

Thereby, the transmission direction can be from a first base station eNB1 to a second base station eNB2.

FIG. 9 shows in a table messages that can be used between n NBs for coordinating interference by aligning blanking patterns to optimize overall network performance.

sICIC Signaling from an External Entity

It shall also be possible to signal blanking patterns based on sTTI's from an external computer, doing optimization of a cellular network infrastructures, such as used in self-organizing networks (SON). This involves an interface between external computer and the base station.

Multi-Sector Enhancements for Cell-Edge UEs

In embodiments this operation can be extend to a multi-sector operation where blanked sTTI's can be re-used in neighboring cell-sites depending on the position of the UE(s). The eNB can reuse same resource for UEs which are not co-located.

For example, blanked sTTI's can be reused in neighboring cells, if UEs are not co-located, i.e. if UEs are not in vicinity of each other, and therefore cannot interfere.

Embed Channel Feedback in sTTI Frame Structure

In embodiments, the blanked sTTI's can be used to embed sounding reference signals (SRS) in DL or UL direction, as well as in reciprocal transfer of UL SRS in a DL band for CSI pre-coding in an FDD band. Since the sTTI concept allows a higher flexibility to configure signals on the time-frequency grid, this enables fast subband and broadband feedback of reference signals. Thus, SRS can be included with higher flexibility which can be used to feedback CSI from more antennas and thus enable MIMO systems with higher feedback requirements, e.g. MIMO, FD-MIMO, M-MIMO. Massive MIMO (M-MIMO) refers to MIMO systems with a very large number of transmit and/or receive antennas, e.g. 100 or more antenna ports.

Add Additional SRS (in PDCCH and/or PDSCH)

In embodiments, additional reference signals can be embedded in the DL control and/or data channel to support channel estimation at the UE for a larger set of transmit antennas within a smaller time duration (due to TTI shortening or overclocking of the standard LTE system). Due to the shortened symbol duration, the number of antennas which can be estimated within, e.g., 10 ms is larger compared to a standard LTE system.

In embodiments, reference symbols (RS) can be added in the downlink control channel, e.g. additional demodulation reference symbols (DMRS).

In embodiments, instead of payload data, antenna-specific reference symbols (RS) can be embedded into the downlink data channel.

Figure 10:
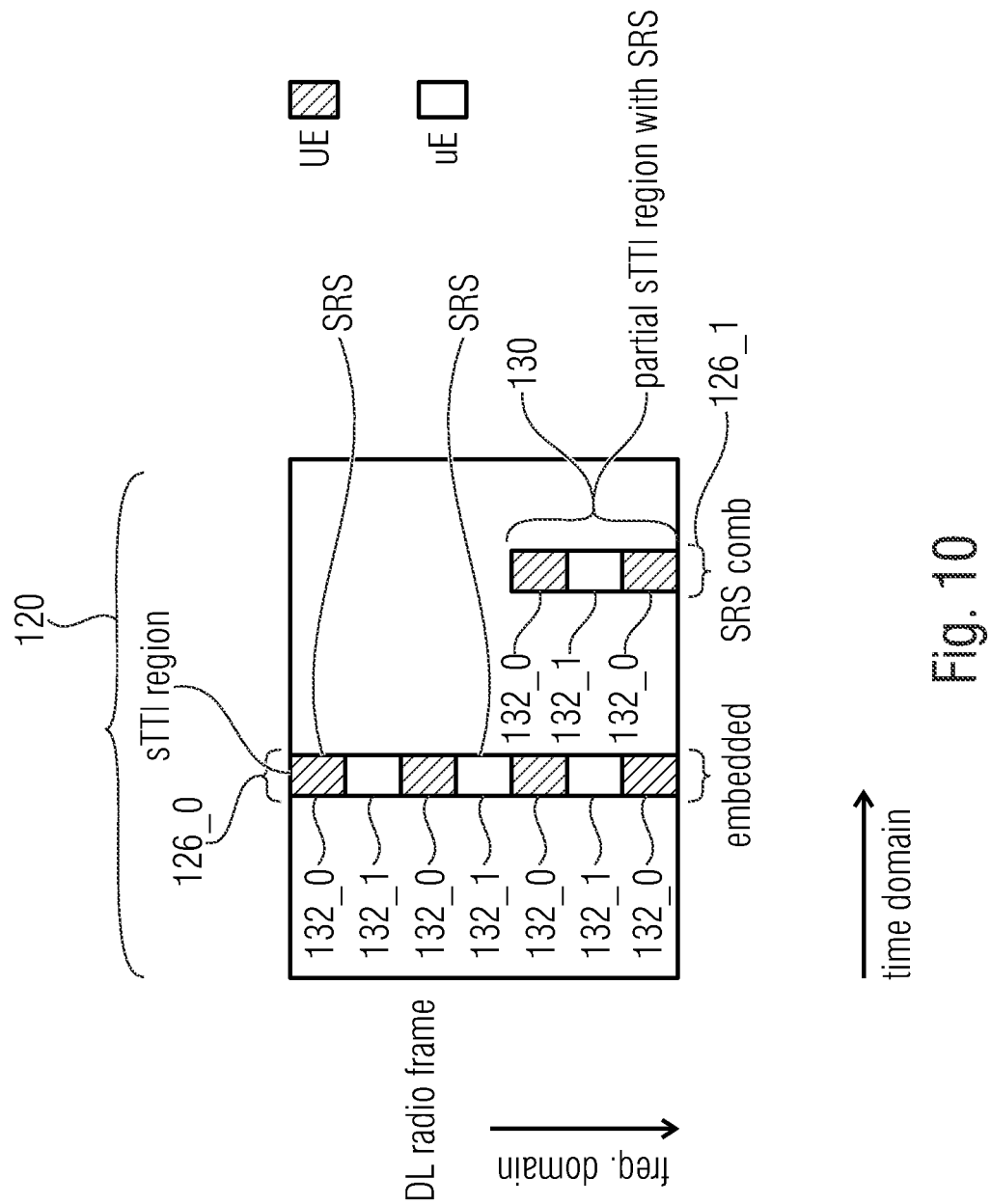
FIG. 10 shows in a diagram a diagram an example of a downlink subframe with partially blanked sTTI's and uplink feedback transmission embedded in the blanked sTTI's.

FIG. 10 shows in a diagram a diagram an example of a downlink subframe 120 with partially blanked sTTI's and uplink feedback transmission embedded in the blanked sTTIs. In FIG. 10, the ordinate describes the frequency domain and the abscissa the time domain.

As shown in FIG. 10, the downlink subframe 120 may comprise a first (fully) blanked sTTI 126_0 extending over the entire frequency band of the downlink subframe 120 and a partially blanked sTTI 126_1 extending only over a subband 130 of the frequency band of the downlink subframe 120. The sTTI's can be used for uplink feedback transmission by one uE or more than one uE. In FIG. 10, exemplarily two uE's perform uplink feedback transmission in the blanked sTTI's 126_0 and 126_1 using a FDMA and/or TDMA scheme. Uplink feedback transmission may include, for example, a transmission of SRS. FIG. 10 exemplarily shows a transmission of SRS 132_0 of a first uE and a transmission of SRS 132_1 of a second UE in the blanked sTTI's 126_0 and 126_1.

In other words, FIG. 10 RS embedding in DL radioframe on time-frequency grid. Thereby, SRS can be embedded into an sTTI region in a DL radioframe. SRS of several UEs can be multiplexed to be used in a SRS comb structure, e.g. alternating SRS using orthogonal sequences.

Addition of Additional SRS (in PUCCH and/or PUSCH)

In embodiments, additionally, additional SRS feedback can be embedded in uplink (UL) radioframes. For this, the data mapping of embedding SRS sequences can be modified according to LTE's UL radioframe structure, in particular to the requirements the time-frequency grid of SC-FDMA structure.

Reciprocal SRS in FDD Systems

In embodiments, the baseline system can be a FDD system, with DL and UL in co-located frequency bands, where the basestation needs SRS of the DL channel. This SRS can be used for pre-coding in the DL. Since the radio channel is highly varying, the basestation needs fast feedback to avoid using outdated channel state information. Here, the SRS of the UE can be embedded into blanked DL sTTI's, such that the UE feedback UL SRS in the DL frame structure on the same frequency band. The basestation can measure the SRS sequences and use the channel reciprocity to reconstruct the radio channel. This information can be used in subsequent scheduling intervals to precode data to this UE.

For this, the basestation can assign the UE UL slots, and if needed guard periods, in order to trigger a UL SRS from the particular UE. Furthermore, the basestation can multiplex several UEs into the same sTTI using orthogonal sequences, in order to reduce the number of UL SRS embedded into the DL radioframe. This may involve signaling information from the basestation to the UE(s) involved. Furthermore, the basestation can configure a time period or pattern when the same UL SRS signal can be repeated, in order to reduce signaling information in the DL, e.g. by specifying a precise time period and assigned frequency position, when and/or where to transmit SRS information. The basestation can define the bandwidth used for the UL SRS, which might vary, depending on the number UEs if several are multiplexed into the same time/frequency resource.

The sTTI's used can be the sTTI's without DL RS signals, i.e. the DL OFDM symbol which typically only transport PDSCH.

In embodiments, eMBMS subframes can be re-used. To avoid interference between DL RS and the novel UL SRS signals, the eNB can re-use eMBMS DL subframes, which are blank subframes without DL DRMS symbols. Here, UL sTTI SRS combs can be triggered without conflicts of DL DRMS.

Figure 11:
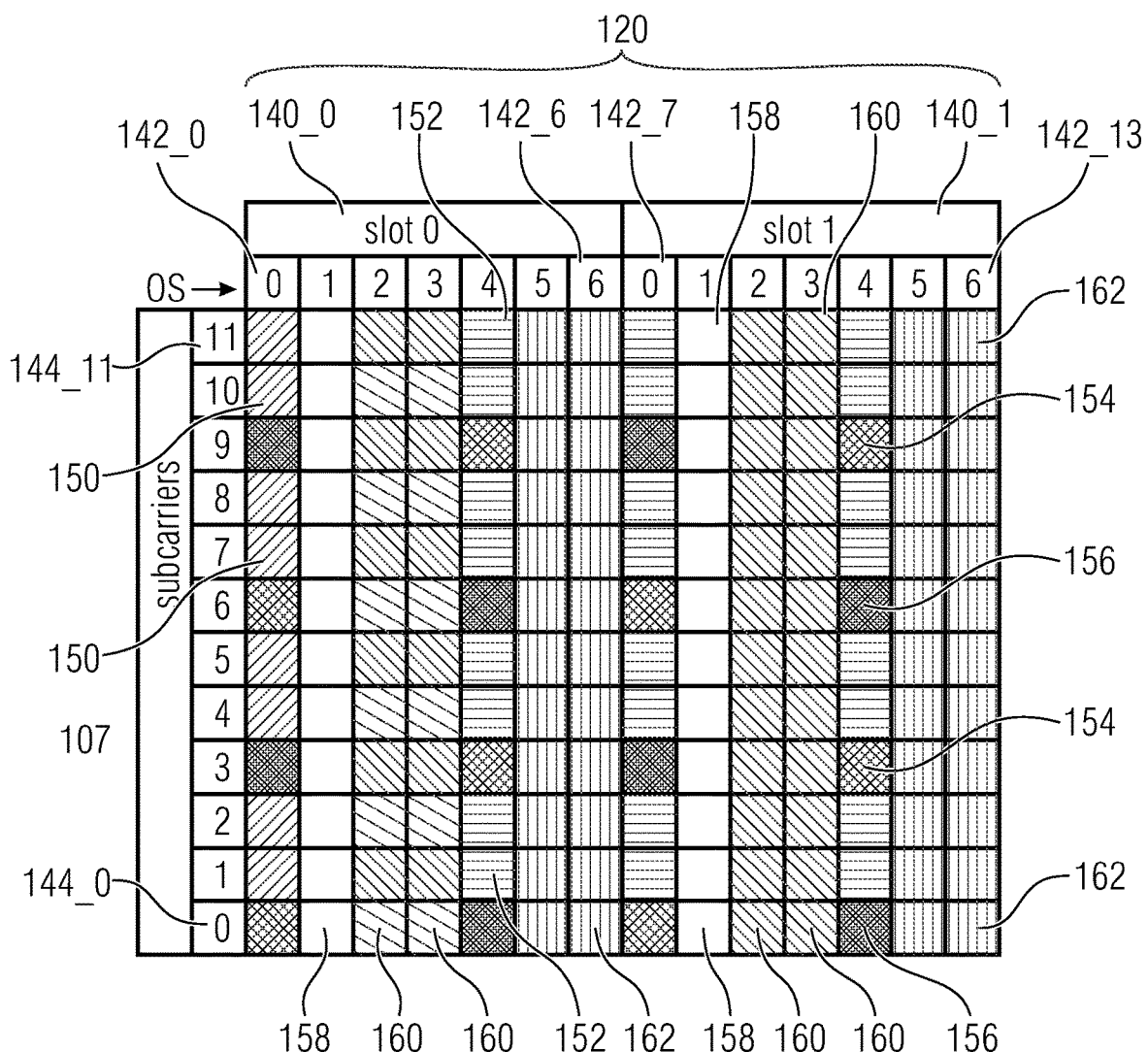
FIG. 11 shows in a diagram an example of a downlink physical resource block (subframe) of LTE FDD system.

FIG. 11 shows in a diagram an example of a downlink physical resource block (subframe) 120 of LTE FDD system. In FIG. 11, the ordinate denotes the frequency domain and the abscissa the time domain. The downlink subframe 120 comprise two slots 140_0 and 140_1, each of the slots 140_0 and 140_1 comprising seven symbols 142_0 to 142_6 and 142_7 to 142_13, i.e. the downlink subframe 120 comprises 14 symbols 142_0 to 142_13. Further, 12 subcarriers 144_0 to 144_11 may be used for the downlink subframe 120. Thus, 168 resource elements are available in the downlink subframe.

Further, in FIG. 11 resource elements assigned to PDCCH (Physical Downlink Control Channel), PCFICH (Physical Control Format Indicator Channel) and PHICH (Physical Hybrid ARQ (Automatic Repeat reQuest) Indicator Channel) are indicated with reference numeral 150, resource elements assigned to sPDCCH (short TTI PDCCH) are indicated with reference numeral 152, resource elements assigned to RS (cell-specific Reference Signal) for selected Tx antenna port are indicated with reference numeral 154, resource elements assigned to Unused by selected Tx antenna port, or undefined for all ports are indicated with reference numeral 156, resource elements assigned to guard symbols are indicated with reference numeral 158, resource elements assigned to uplink pilot comb (i.e., SRS) are indicated with reference numeral 160, and resource elements assigned to sPDSCH: Downlink sTTI are indicated with reference numeral 162.

In other words, FIG. 11 depicts one physical resource block (PRB) of a DL radioframe of a full LTE FDD carrier using a sTTI configuration with sTTI termination after two OFDM symbols (OS). The sTTI's in Slot0 140_0 and Slot1 140_1 at OS-2-3 indicated with reference numeral 160 (marked with blue color) are UL SRS symbols send by one or more UEs, see the pilot SRS comb in Slot0 140_0 indicated with reference numeral 160 (depicted with dark and light blue colors). The SRS can be used for precoding in successive DL sTTI's, e.g. OS-5-6 in the sPDSCH. Depending on the UE's timing advance (TA), a small guard period for switching between DL and UL sTTI's might be included, see reference numeral 158 (light grey shaded area) in OS-1 of Slot0 140_0 and Slot1 140_1.

Multicellular Extension

In a multi-cellular context, a message can be used to signal over X2 interface to neighboring cells which region can be used for UL CSI transmission in sTTI, similar to sICIC message shown in FIG. 12.

Feedback Control Signaling Using URLLC Frame Structure

In embodiments, sTTI/URLLC frame structure can be re-used to transmit other control information from the eNB to the UE or from the UE to the eNB. This would allow implementation of a proprietary signaling channel leveraging the sTTI frame structure.

Exchange of MIMO Feedback

In embodiments, sTTI/URLLC frame structure can be re-used to provide additional multi-antenna feedback, e.g. transmission of beamsteering vectors or precoding matrix feedback for MIMO systems with many antennas, e.g. as needed by FD- or M-MIMO systems.

Full Duplex Operation

In embodiments, the eNB can operate in a full duplex mode, for simultaneous DL and UL traffic in the same DL band. Here the eNB allows simultaneous DL sPDSCH transmission and UL sTTI SRS feedback reception from one or more UEs. Since the eNB knows its DL symbols to be transmitted, these can be stored and be subtracted from the received SRS symbols in the UL which allows this simultaneous transmission mode.

FIG. 13 shows a schematic block diagram of a full duplex operation of an eNB 160. The eNB can be configured to transmit a downlink (DL) signal, e.g., to a uE, e.g., over the antenna 162. Further, the eNB 160 can be configured to receive an uplink (UL) signal, e.g., from the uE, e.g., over the antenna 162, during the transmission of the DL signal and in the frequency band of the DL signal. The eNB 160 can be configured to subtract the DL signal from the received UL signal, to obtain a clean UL signal.

In other words, FIG. 13 shows a full duplex operation with subtraction of DL signal from received UL SRS.

FIG. 14 shows a flowchart of an operation of a communication system with uplink feedback in blanked sTTI's. The communication system can comprise a transceiver of a first type 170 (e.g., a base station (eNB)) and a transceiver of a second type 172 (e.g., a mobile terminal (uE)).

The transceiver of a first type 170 can comprise a transmitter and a receiver (transmitter 1/receiver1). The transceiver of a second type 172 can comprise a transmitter and a receiver (transmitter 2/receiver2). The transceiver of the first type 170 can be configured to perform resource allocation.

The transceiver of the first type 170 can be configured, in a first step 174, to perform a blanking of (downlink) resources (e.g., (partial) blanking of sTTI's of a (downlink) resource block). The transceiver of the first type 170 can comprise a scheduler configured to schedule the blanking of resources. Naturally, it is also possible that the transceiver of the first type 170 can be configured to perform a blanking of resources based on a schedule information, e.g., received from a scheduler, e.g., of another transceiver of the first type.

The transceiver of the first type 170 can be configured, in a second step 176, to signal to the transceiver of the second type 172 an uplink feedback grant in the blanked resources, The transceiver of the second type 172 can be configured, in a third step 178, to transmit uplink feedback data (e.g., UL SRS) in the downlink resources of the transceiver of the first type 170.

The transceiver of the first type 170 can be configured, in a fourth step 180, to perform a channel estimation based on the uplink feedback data (e.g., UL SRS) received from the transceiver of the second type 172.

Figure 15A:
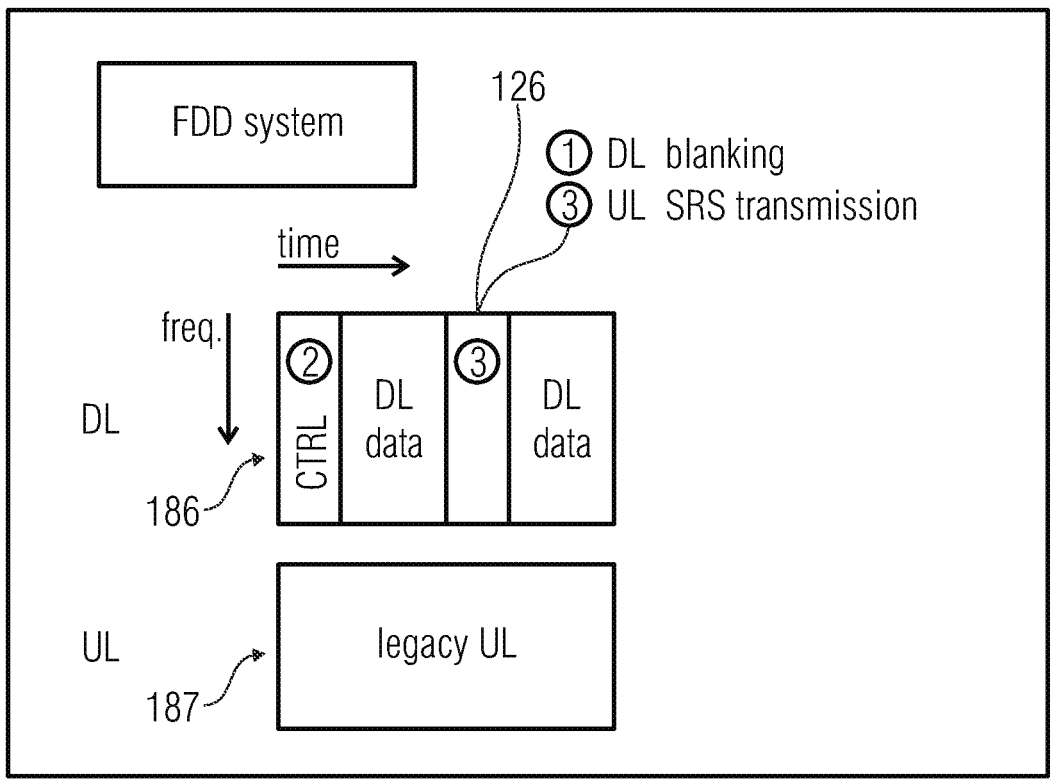
FIG. 15a shows a schematic view of resources of a FDD system.

FIG. 15a shows a schematic view of resources of a FDD system. In detail, in FIG. 15a a downlink resource block (e.g., subframe) 186 and an uplink resources block (e.g., subframe) 187 of a FDD system are shown. Thereby, the ordinate denotes the frequency domain and the abscissa the time domain.

As indicated in FIG. 15a, the DL resource block and the UL resource block may be allocated to different (non-overlapping) frequency bands. The UL resource block 187 can be reserved for legacy UL transmissions.

The downlink resources block (or downlink subframe) 186 can comprise a (partially) blanked sTTI 126 that can be used for uplink feedback transmission, e.g., by a uE. The rest of the downlink resources block (or downlink subframe) 186 can be used for downlink control data and downlink data transmission.

Figure 15B:
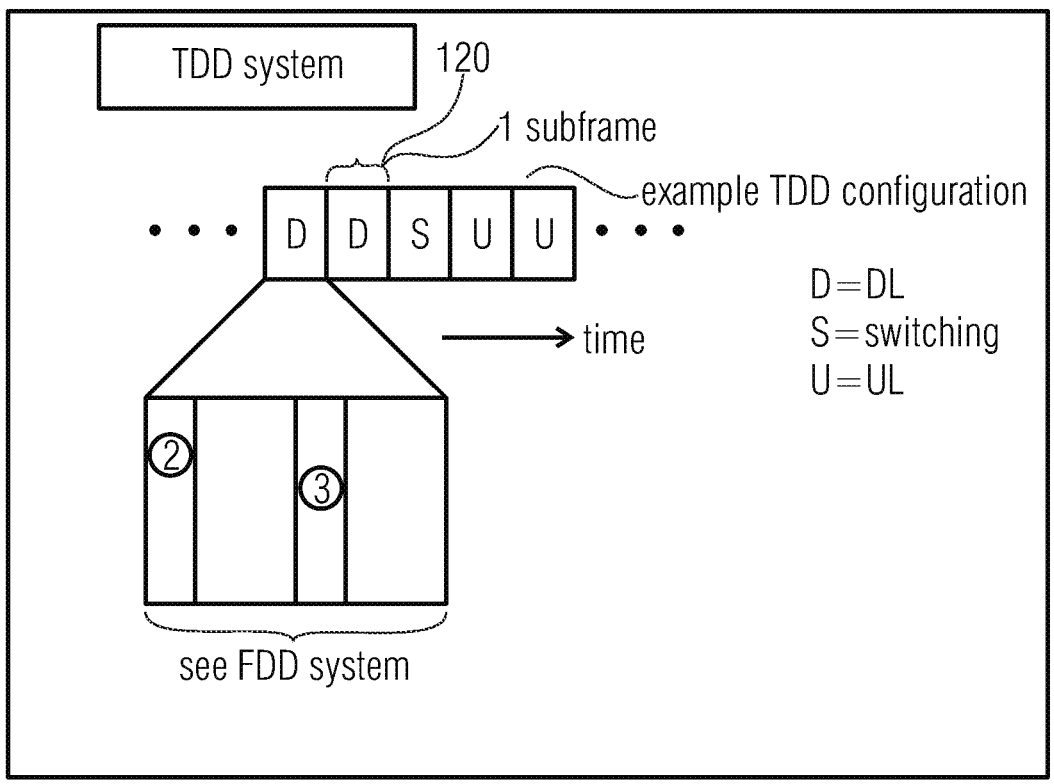
FIG. 15b shows a schematic view of resources of a TDD system.

FIG. 15b shows a schematic view of resources of a TDD system. According to a TDD system configuration, subframes 120 can be downlink subframes (i.e., subframes reserved for downlink transmission) or uplink subframes (i.e., subframes reserved for uplink transmission), wherein a switching subframe can be used as guard between a downlink subframe and an uplink subframe.

The downlink subframe of the TDD system can be configured similarly to the downlink subframe described in FIG. 15a.

Figure 16:
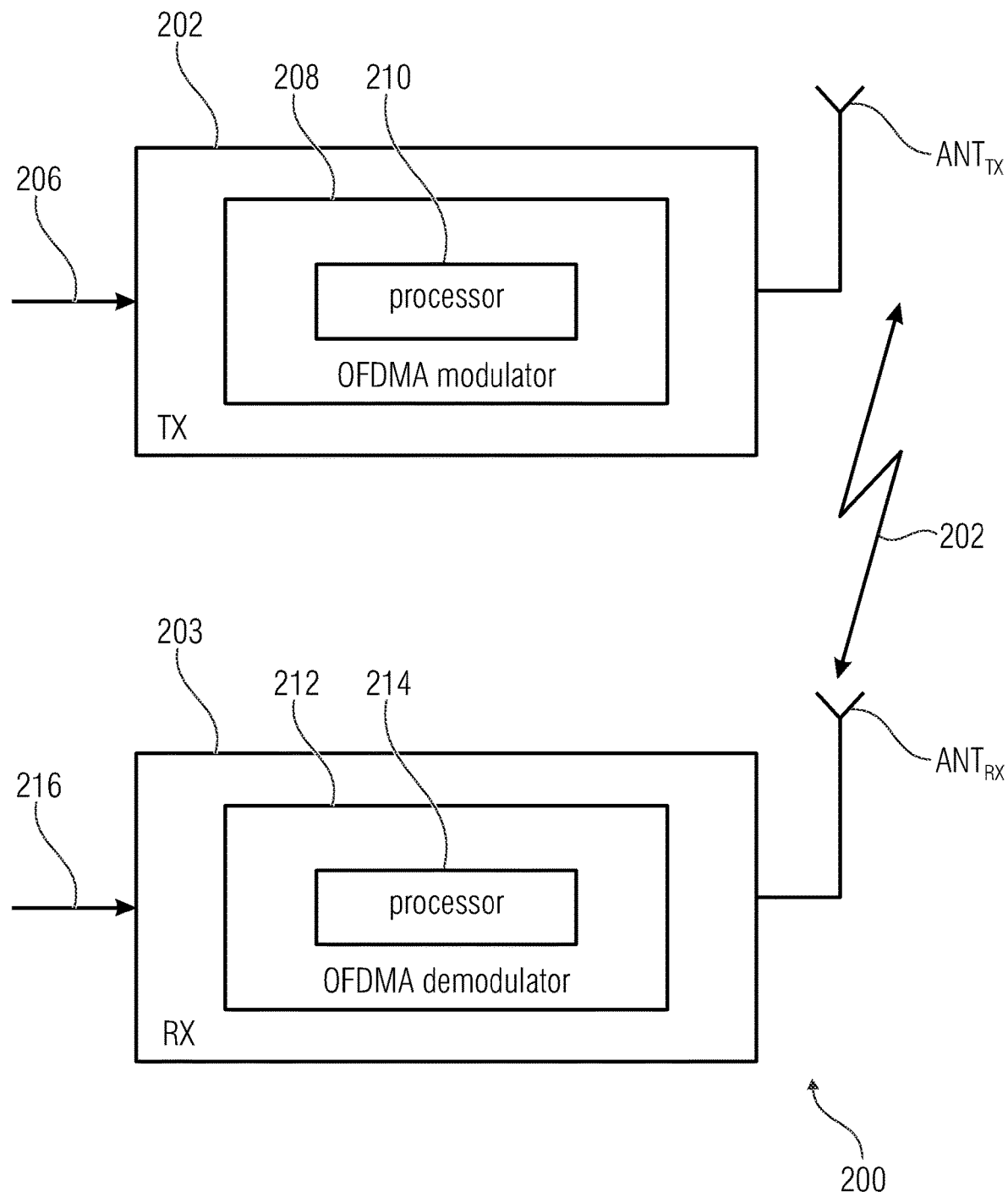
FIG. 16 is a schematic representation of a wireless communication system for transmitting information from a transmitter to a receiver.

Embodiments of the present invention may be implemented in a wireless communication system as depicted in FIG. 16 including a transmitter 202, like a base station, and a receiver 203, like a mobile terminal. FIG. 16 is a schematic representation of a wireless communication system 200 for transmitting information from a transmitter TX to a receiver RX. The transmitter TX includes at least one antenna $ANT_{TX}$ and the receiver RX includes at least one antenna $ANT_{RX}$. In other embodiments, the transmitter TX and/or the receiver RX may include more than one antenna to implement a MIMO, SIMO or MISO. As is indicated by the arrow 204 signals are transmitted from the transmitter TX to the receiver RX via a wireless communication link, like a radio link. The transmission may be in accordance with the OFDMA or IFFT-based communication approach, and the above referenced transmission time interval indicates the time period of a radio transmission from the transmitter TX to the receiver RX. The transmitter TX comprises an input 206 for receiving data to be transmitted to the receiver RX. The input data 206 is received at an OFDMA modulator 208 comprising a signal processor 210 for processing the received signals 206 to generate a data signal to be transmitted to the receiver RX. The signaling between the transmitter TX and RX is in accordance with the above described embodiments of the present invention, e.g., the transmitter may include the OFDMA modulator operating so as to generate the SPS Config message including the SPS interval defined on the TTI basis and/or including additional control data. The receiver RX receives via the antenna the signal from the transmitter TX and applies the signal to the OFDMA demodulator 212 including a signal processor 214 for processing the received signal to generate an output signal 216.

Figure 17:
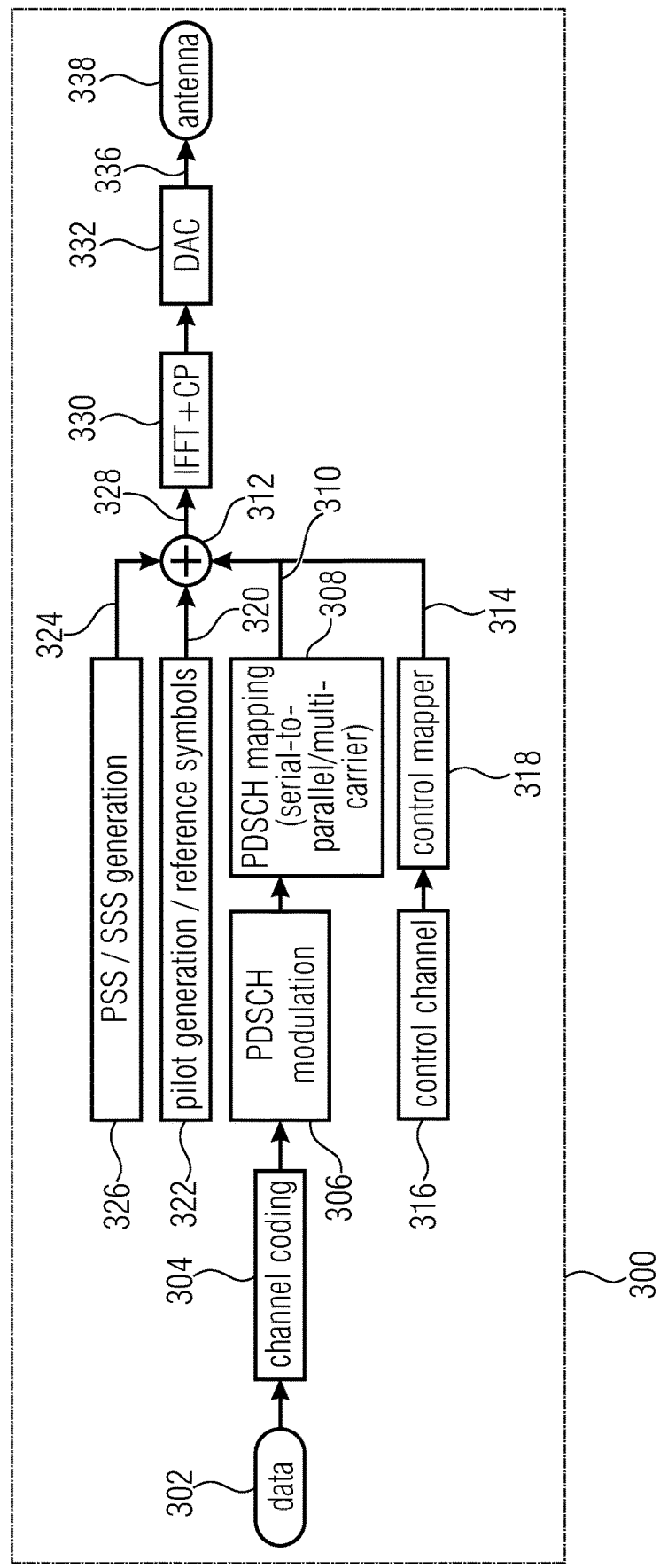
FIG. 17 is a schematic representation of transmitters in a wireless communication system for transmitting data or information to a receiver in accordance with embodiments.

FIG. 17 is a block diagram of a transmitter 300 in a wireless communication system for transmitting information to a receiver in accordance with embodiments described above. The transmitter 300 receives data 302 that is encoded by the channel encoder 304, modulated by the modulator 306 and mapped to the multiple carriers by the mapper 308. The signal 310 is combined at 312 with control signals 314 provided by the control channel unit 316 and the control mapper 318, with pilot symbols 320 from the pilot symbol generator 322, and with PSS/SSS signals 324 from the PSS/SSS signal generator 326. The combined signal 328 is provided to the IFFT+CP block 330, is converted by the DAC 332 into the analog domain. The analog signal 336 is processed for radio transmission and eventually transmitted by the antenna 338. In accordance with embodiments, the inventive aspects, e.g., generating the SPS configuration message including the SPS interval defined on the TTI basis and/or including additional control data may be implemented using the mapper 318 for mapping the control data.

Embodiments provide a better or improved (or even optimized) performance in the downlink radio transmission by utilizing a highly flexible and ultra-low delay UL feedback channel to optimized DL MIMO transmissions of systems with many transmit antennas, e.g. especially for FD-MIMO or M-MIMO systems.

Embodiments can be applied, for example, in enhanced mobile broadband (eMBB) services or any other radio communication with multiple antennas (MIMO, FD-MIMO, M-MIMO).

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

ACRONYMS AND SYMBOLS eNB Evolved Node B (3G base station)
LTE Long-Term Evolution
UE or uE User Equipment (User Terminal)
RRM Radio Resource Management
TDD Time Division Duplex
FDD Frequency Division Duplex
MIMO Multiple Input Multiple Output
OFDM Orthogonal Frequency Division Duplexing
OFDMA Orthogonal Frequency-Division Multiple Access
CQI Channel Quality Information
CRC Cyclic Redundancy Check
SPS Semi-persistent Scheduling
DCI Downlink Control Information
UL Uplink
DL Downlink
(s)TTI (short) Transmission Time Interval
PUSCH Physical Uplink Shared Channel
PUCCH Physical Uplink Control Channel
PDSCH Physical Downlink Shared Channel
PDCCH Physical Downlink Control Channel
URLLC Ultra-reliable Low-latency Communications
MBSFN Multimedia Broadcast Single Frequency Network
C-RNTI Cell Radio Network Temporary Identity
SON Self-Organizing Networks

REFERENCES

[1] 3GPP TS 36.211 V13.1.0
[2] 3GPP TS 36.213 V13.1.1
[3] http://niviuk.free.fr/lte_srs.php
[4] http://howltestuffworks.blogspot.de/2014/07/sounding-reference-signal-procedure.html
[5] 3GPP TS 36.423, sect. 9.1.2.1

The invention claimed is:

1. A transceiver,
wherein the transceiver is configured to receive data in at least one transmission time interval on certain allocated resource elements of a wireless communication system;
wherein the transceiver is configured to at least partially blank a transmission time interval; wherein the transceiver is configured to receive from another transceiver a transmission grant in a blanked part of the at least partially blanked transmission time interval,
wherein the transceiver is configured to receive data using a data signal, the data signal comprising a plurality of frames, each frame comprising a plurality of subframes, and each subframe comprising a number of symbols in the time domain and a number of subcarriers in the frequency domain,
wherein the transmission time interval is defined by a predefined number of symbols in the time domain,
wherein the transmission time interval is shorter than one subframe.

2. The transceiver of claim 1, configured to transmit or receive data using a data signal, the data signal comprising a plurality of frames, each frame comprising a plurality of subframes, and each subframe comprising a number of symbols in the time domain and a number of sub-carriers in the frequency domain, wherein the transmission time interval is defined by a predefined number of symbols in the time domain.

3. The transceiver of claim 2, wherein the transmission time interval is shorter than one subframe.

4. The transceiver of claim 1, configured to at least partially blank the transmission time interval by blanking at least a subset of symbols in the time domain of the transmission time interval.

5. The transceiver of claim 1, configured to at least partially blank the transmission time interval by blanking at least a subset of sub-carriers in the frequency domain of the transmission time interval.

6. The transceiver of claim 1, configured to at least partially blank the transmission time interval by blanking at least a subset of resource elements of the transmission time interval in at least one out of time domain and frequency domain.

7. The transceiver of claim 1, configured to signal to another transceiver a transmission grant for transmitting a reference signal in a blanked part of the at least partially blanked transmission time interval.

8. The transceiver of claim 7, configured to use a downlink control channel to signal the transmission grant.

9. The transceiver of claim 1, configured to blank at least one out of demodulation reference symbols and data symbols in the at least partially blanked transmission time interval.

10. The transceiver of claim 7, configured to blank all symbols of the transmission time interval.

11. The transceiver of claim 1, configured to only transmit at least one out of reference symbols and demodulation reference symbols in the at least partially blanked transmission time interval.

12. The transceiver of claim 11, configured to not transmit at least one out of data symbols and control symbols in the at least partially blanked transmission time interval.

13. The transceiver of claim 1, configured to partially blank parts of the transmission time interval in at least one part out of time domain and frequency domain.

14. The transceiver of claim 1, configured to use a blanked part of the at least partially blanked transmission time interval for transmitting or receiving a reference signal.

15. The transceiver of claim 14, configured to at least partially blank a transmission time interval for a data block to be transmitted by the transceiver in a downlink band or during downlink time interval of the wireless communication system;

wherein the transceiver is configured to use a blanked part of the at least partially blanked transmission time interval for receiving a reference signal from the other transceiver in the downlink band or during the downlink time interval of the wireless communication system.

16. The transceiver of claim 14, configured to blank at least one out of a data channel and a control channel in the transmission time interval;

wherein the transceiver is configured to use the blanked channel of the transmission time interval to receive the reference signal from the other transceiver.

17. The transceiver of claim 14, configured to at least partially blank a downlink transmission time interval;

wherein the transceiver is configured to use a blanked part of the at least partially blanked downlink transmission time interval for receiving an uplink reference signal from the other transceiver in the downlink transmission time interval in the downlink frequency band.

18. The transceiver of claim 17, configured to use channel reciprocity to estimate properties of the communication channel from the other transceiver to the transceiver based on the received uplink reference signal;

wherein the transceiver is configured to precode data to be transmitted to the other transceiver in a subsequent transmission time interval based on the estimated properties of the communication channel from the other transceiver to the transceiver.

19. The transceiver of claim 17, configured to signal to the other transceiver the parts of the at least partially blanked downlink transmission time interval to be used by the other transceiver to transmit the uplink reference signal.

20. The transceiver of claim 17, configured to use a blanked part of the at least partially blanked downlink transmission time interval for receiving at least two uplink reference signals from at least two other transceivers in the downlink transmission time interval in the downlink frequency band;

wherein at least two uplink reference signals are orthogonal to each other.

21. The transceiver of claim 14, configured to signal to another transceiver of another cell of the communication system a transmission grant in a blanked part of the at least partially blanked transmission time interval, or to signal to another transceiver of another cell of the communication system a blanking pattern used for at least partially blanking the transmission time interval.

22. The transceiver of claim 1, configured to use a blanked part of the at least partially blanked transmission time interval for transmitting or receiving a control information.

23. The transceiver of claim 22, wherein the control information is a MIMO feedback information.

24. The transceiver of claim 1, wherein the transceiver is a base station in the wireless communication system, and the data signal is an IFFT based signal, the IFFT based signal comprising a plurality of frames, the frame comprising a plurality of sub-frames.

25. The transceiver of claim 1, wherein the transceiver is configured to receive the blanking pattern from an interference optimization terminal, the blanking pattern indicating to blank a resource element based on the transmission time interval.

26. A method, comprising:

receiving data in at least one transmission time interval on certain allocated resource elements of a wireless communication system;

at least partially blanking a transmission time interval; and receiving from another transceiver a transmission grant in a blanked part of the at least partially blanked transmission time interval, wherein the data is received using a data signal, the data signal comprising a plurality of frames, each frame comprising a plurality of subframes, and each subframe comprising a number of symbols in the time domain and a number of sub-carriers in the frequency domain, wherein the transmission time interval is defined by a predefined number of symbols in the time domain, wherein the transmission time interval is shorter than one subframe.

27. A non-transitory digital storage medium having a computer program stored thereon to perform the method for transmitting, comprising:

receiving data in at least one transmission time interval on certain allocated resource elements of a wireless communication system;

at least partially blanking a transmission time interval; and receiving from another transceiver a transmission grant in a blanked part of the at least partially blanked transmission time interval;

wherein the data is received using a data signal, the data signal comprising a plurality of frames, each frame comprising a plurality of subframes, and each subframe comprising a number of symbols in the time domain and a number of sub-carriers in the frequency domain, wherein the transmission time interval is defined by a predefined number of symbols in the time domain, wherein the transmission time interval is shorter than one subframe, when said computer program is run by a computer.

* * * * *